United States Patent
Kaburagi et al.

[11] Patent Number: 6,160,532
[45] Date of Patent: Dec. 12, 2000

[54] DIGITAL GAMMA CORRECTION CIRCUIT, GAMMA CORRECTION METHOD, AND A LIQUID CRYSTAL DISPLAY APPARATUS AND ELECTRONIC DEVICE USING SAID DIGITAL GAMMA CORRECTION CIRCUIT AND GAMMA CORRECTION METHOD

[75] Inventors: Chiharu Kaburagi; Takashi Kurumisawa; Takahiro Sagawa, all of Suwa, Japan

[73] Assignee: Seiko Epson Corporation, Tokyo, Japan

[21] Appl. No.: 09/041,853

[22] Filed: Mar. 12, 1998

[30] Foreign Application Priority Data

Mar. 12, 1997 [JP] Japan ........................................ 9-76637
Mar. 12, 1997 [JP] Japan ........................................ 9-76638

[51] Int. Cl.[7] .................................................. G09G 3/36
[52] U.S. Cl. ........................... 345/87; 348/674; 348/675; 348/676
[58] Field of Search ................................. 345/88, 87, 89, 345/98, 150; 348/712, 571, 659, 674, 675, 676, 677

[56] References Cited

U.S. PATENT DOCUMENTS

| | | | |
|---|---|---|---|
| 4,999,702 | 3/1991 | Knierim et al. | 348/675 |
| 5,311,297 | 5/1994 | Seki et al. | 348/675 |
| 5,345,265 | 9/1994 | Kim | 348/675 |
| 5,729,297 | 3/1998 | Kwon | 348/674 |
| 5,751,267 | 5/1998 | Sato et al. | 345/87 |
| 5,796,384 | 8/1998 | Kim | 348/674 |
| 5,847,688 | 12/1998 | Ohi et al. | 348/674 |
| 5,933,199 | 8/1999 | Yoon | 348/674 |

*Primary Examiner*—Richard A. Hjerpe
*Assistant Examiner*—Kimnhung Nguyen

[57] ABSTRACT

Image data to which gamma correction for a CRT has been applied is digitally gamma corrected to image data based on an applied voltage-transmittance characteristic of a liquid crystal display unit.

A digital gamma correction circuit for correcting digital image data to which gamma correction for a CRT has been applied to digital image data suitable for driving display on liquid crystal display units 50R, 50G, 50B comprises a first digital gamma correction circuit 24 and a second digital gamma correction circuit 32. The first digital gamma correction circuit 24 applies a first gamma correction containing a correction for effectively restoring digital image data to which gamma correction for a CRT has been applied to the digital image data before gamma correction for a CRT was applied. The second digital gamma correction circuit 32 applies a second gamma correction based on an applied voltage-transmittance characteristic of the liquid crystal display unit to the digital image data before or after the first gamma correction is applied.

23 Claims, 16 Drawing Sheets

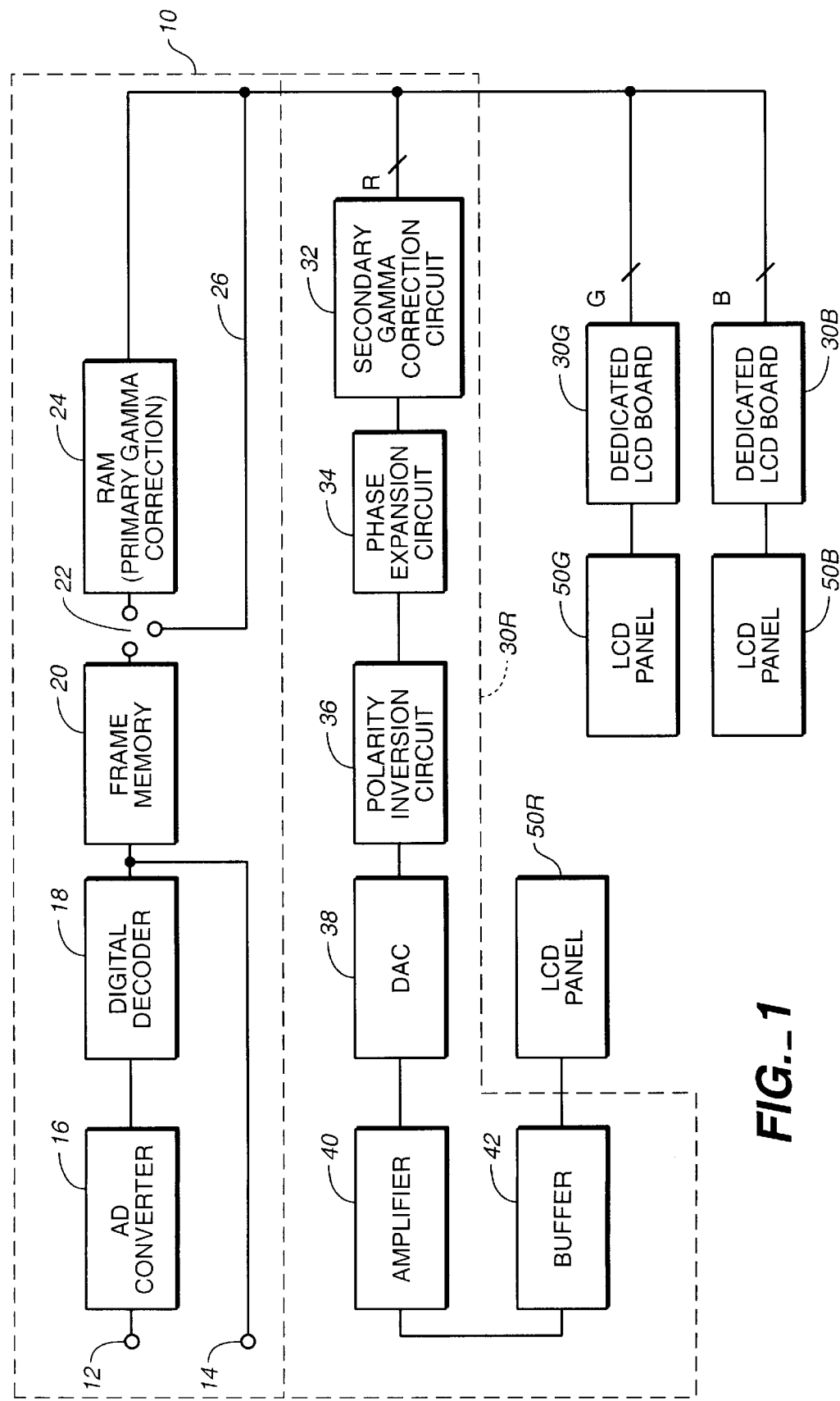
FIG._1

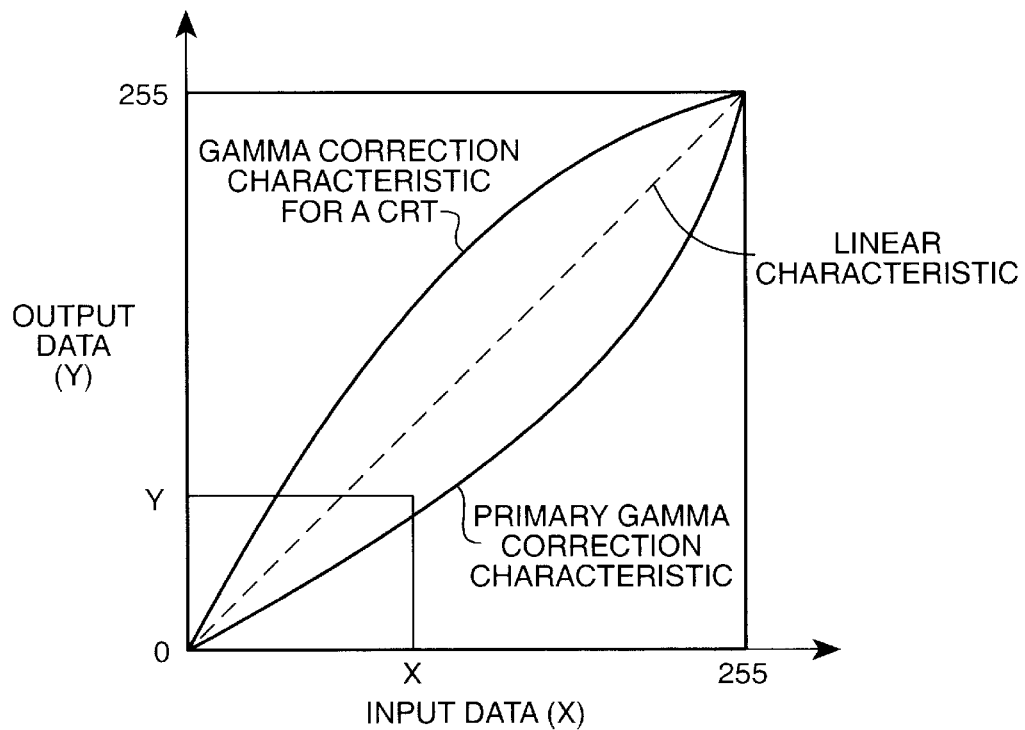
FIG._2
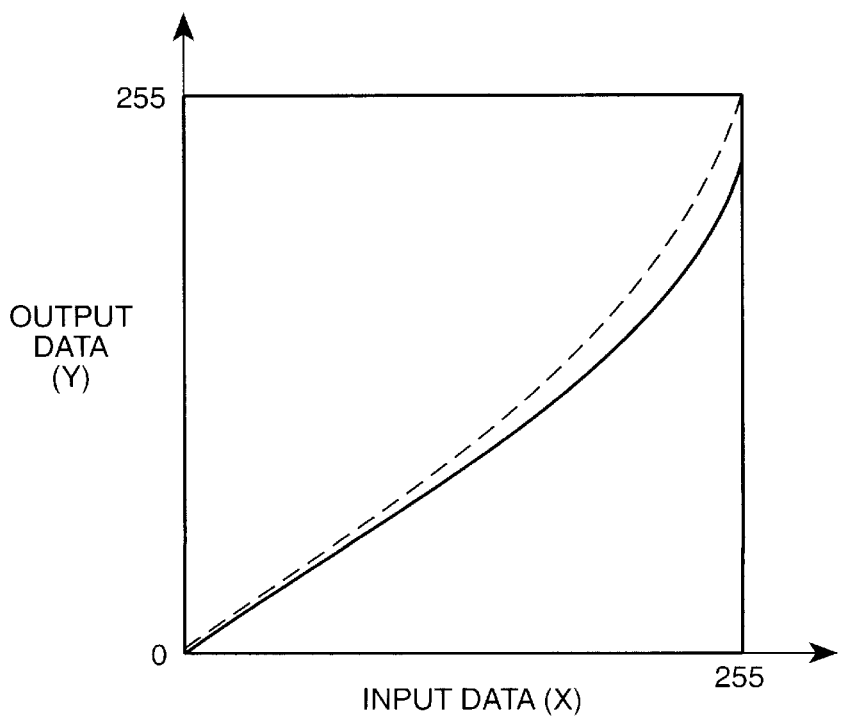
FIG._3

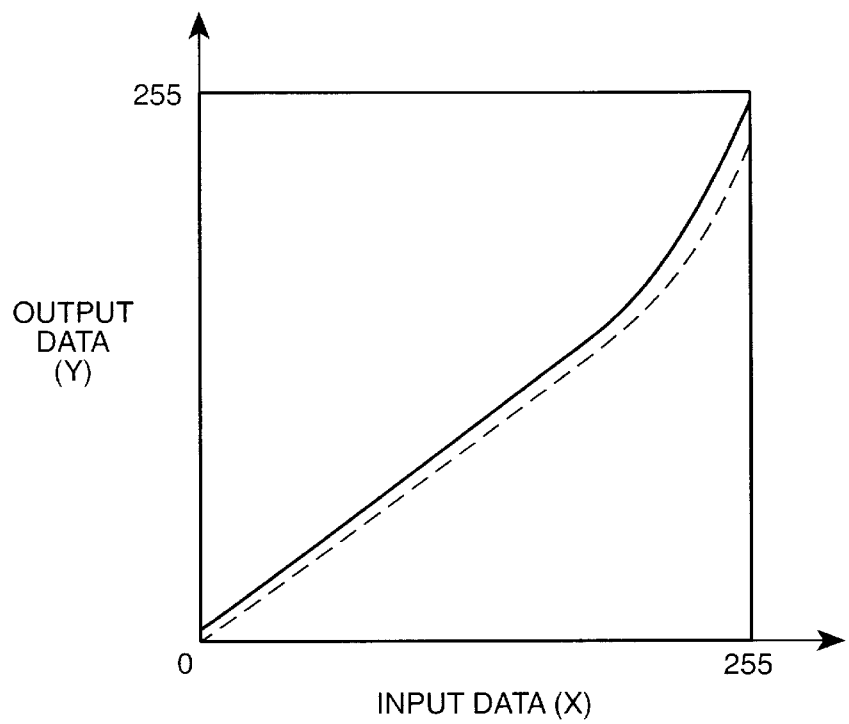
FIG._4
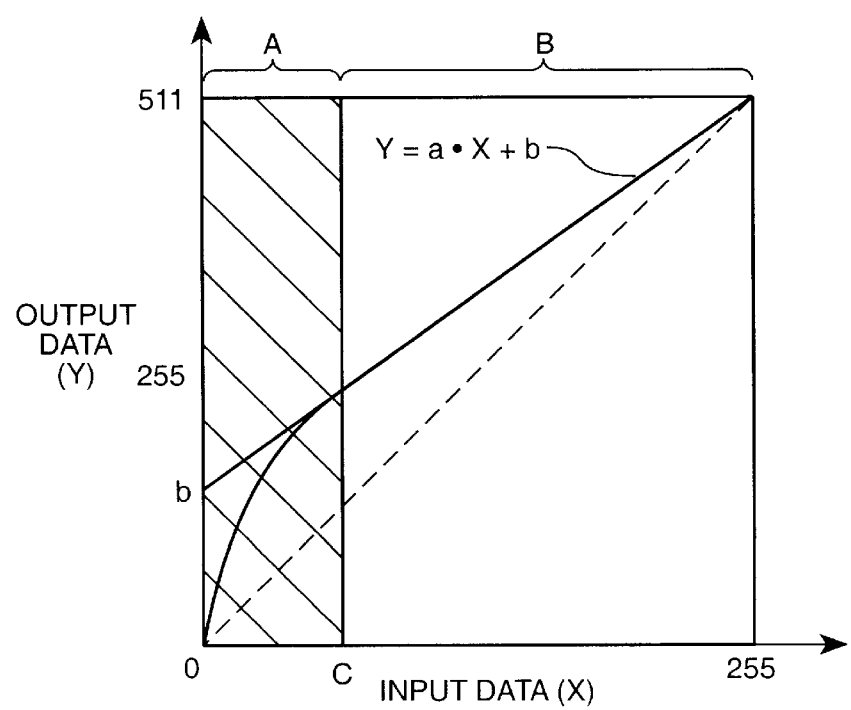
FIG._6

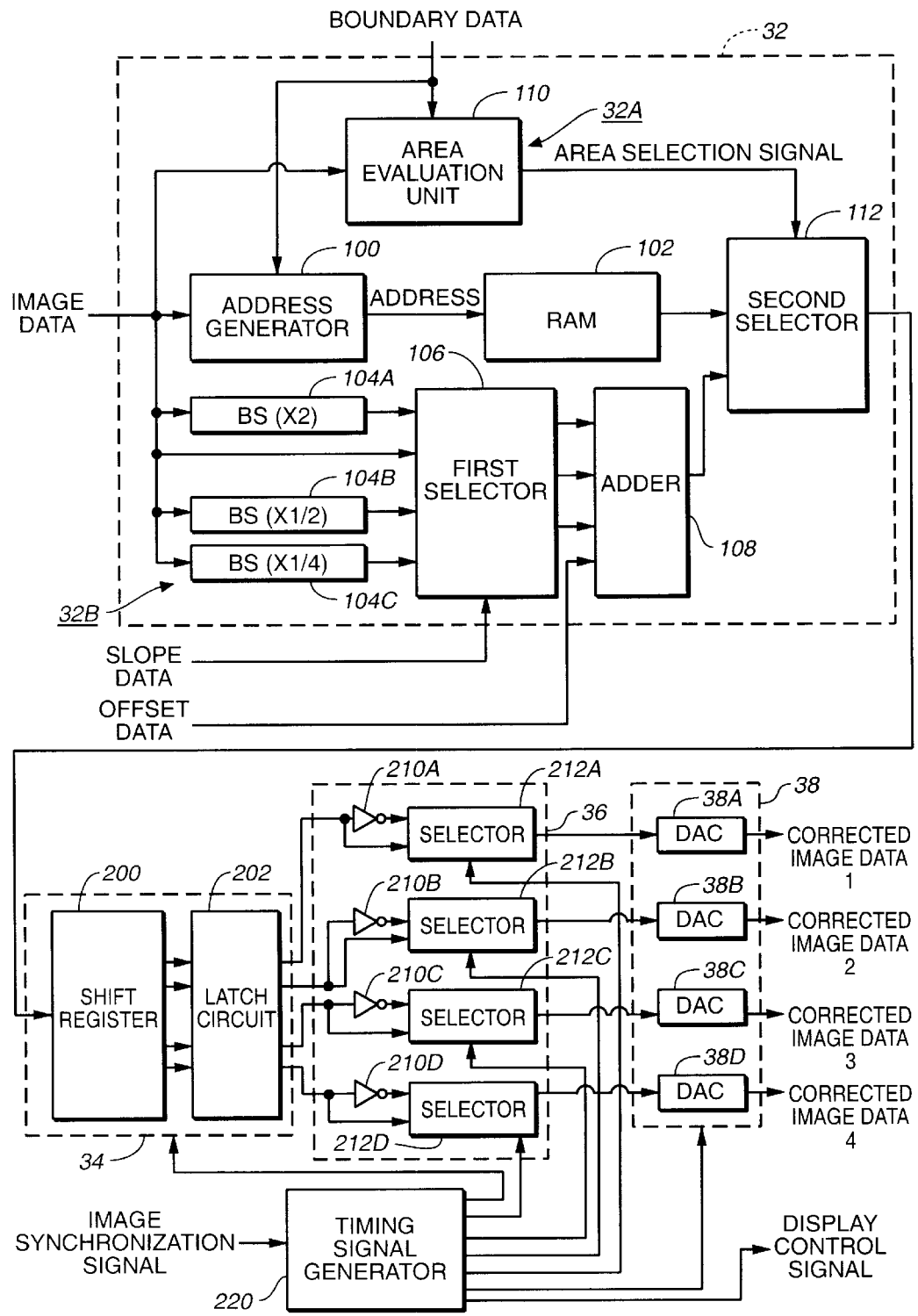
FIG._5

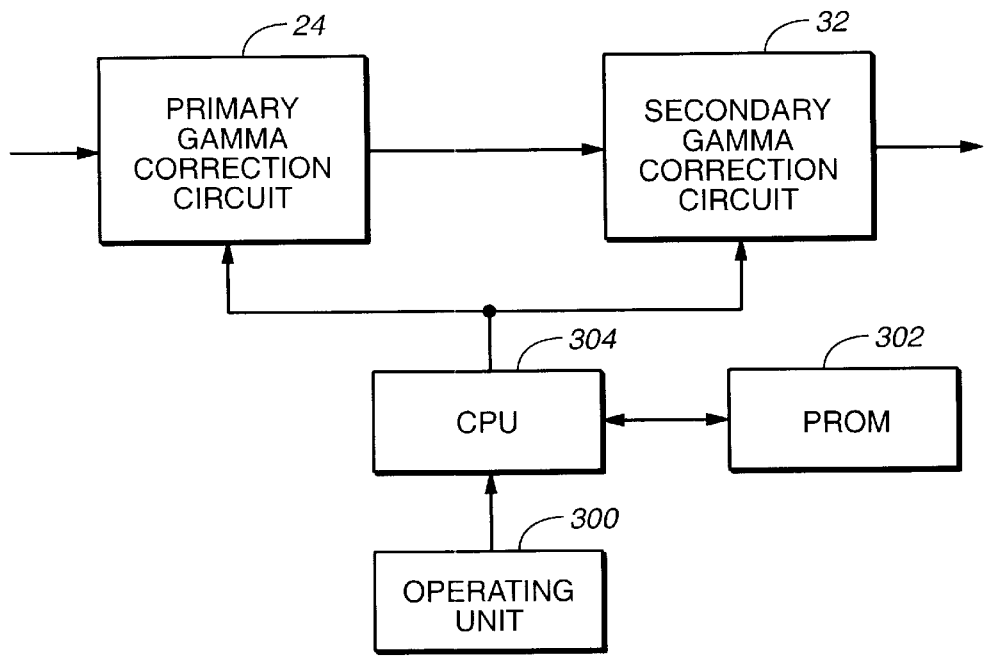
FIG._7
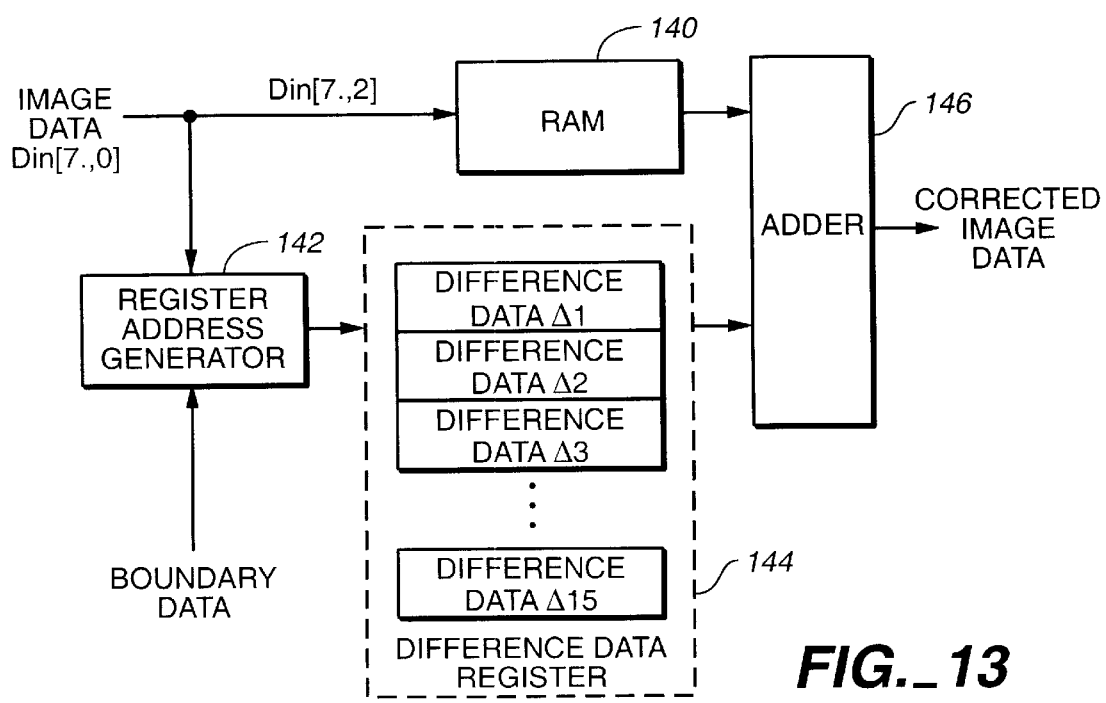
FIG._13

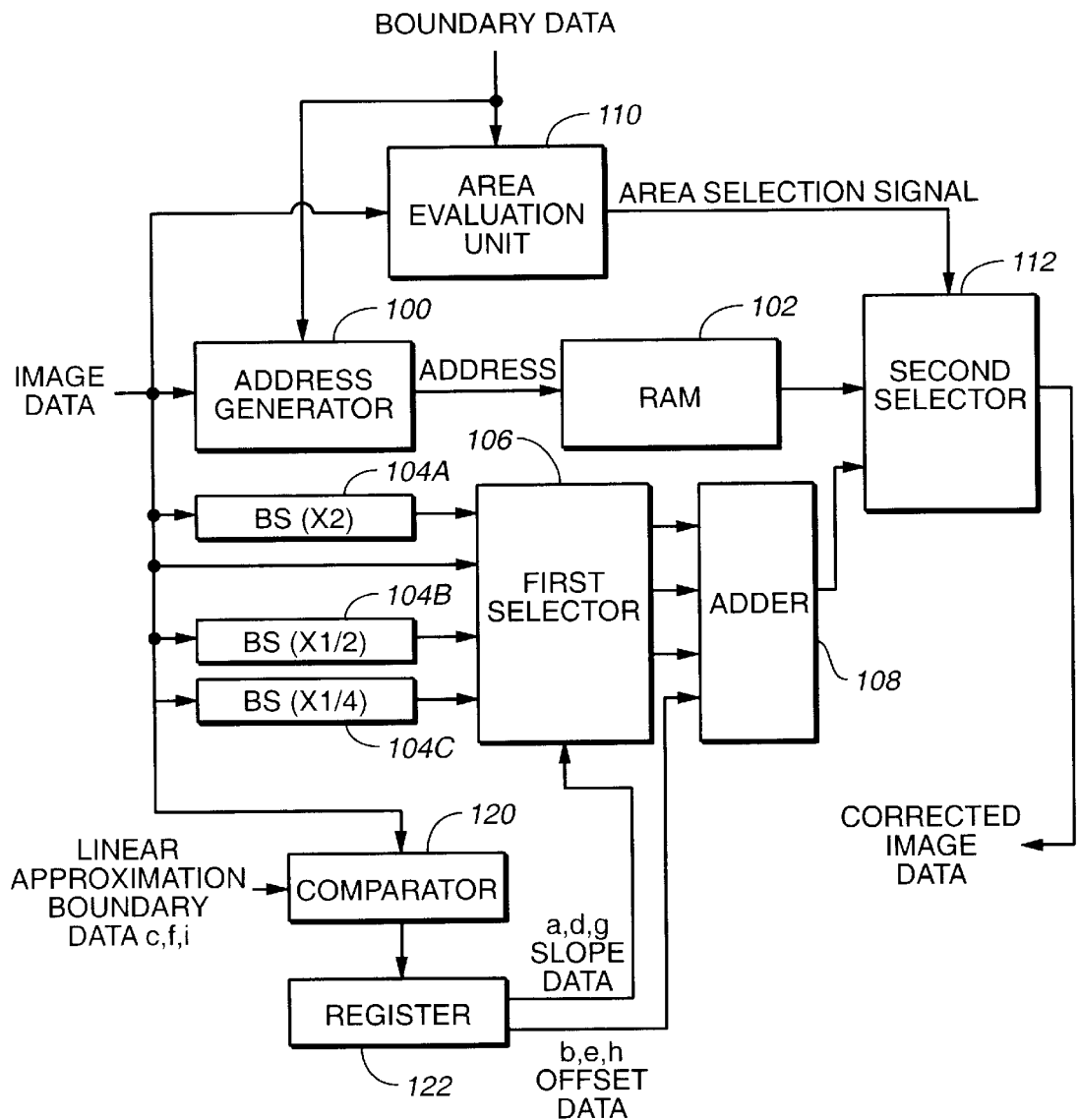
FIG._8

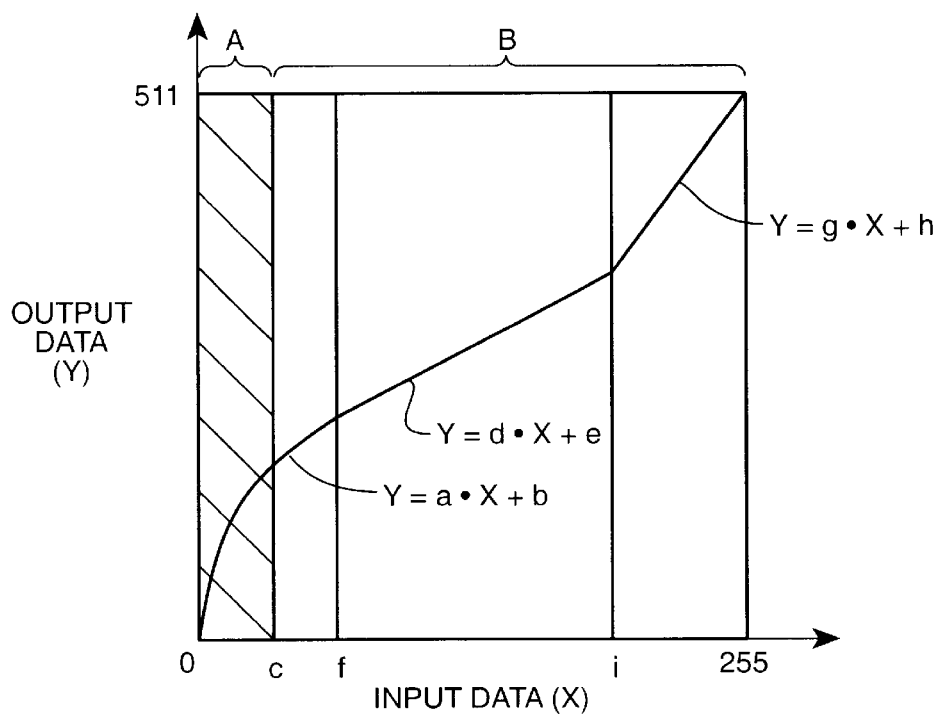
*FIG._9A*
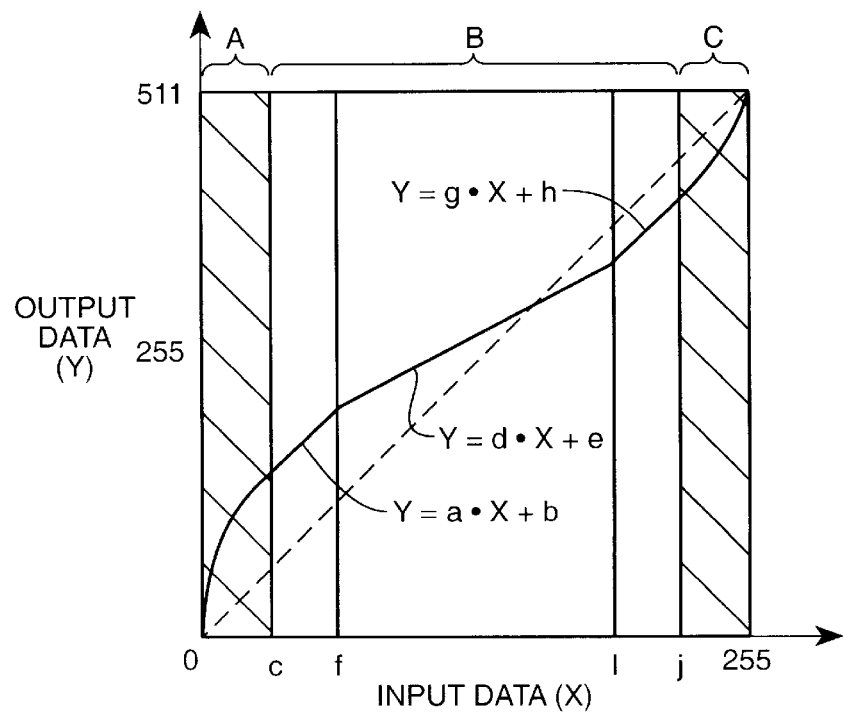
*FIG._9B*

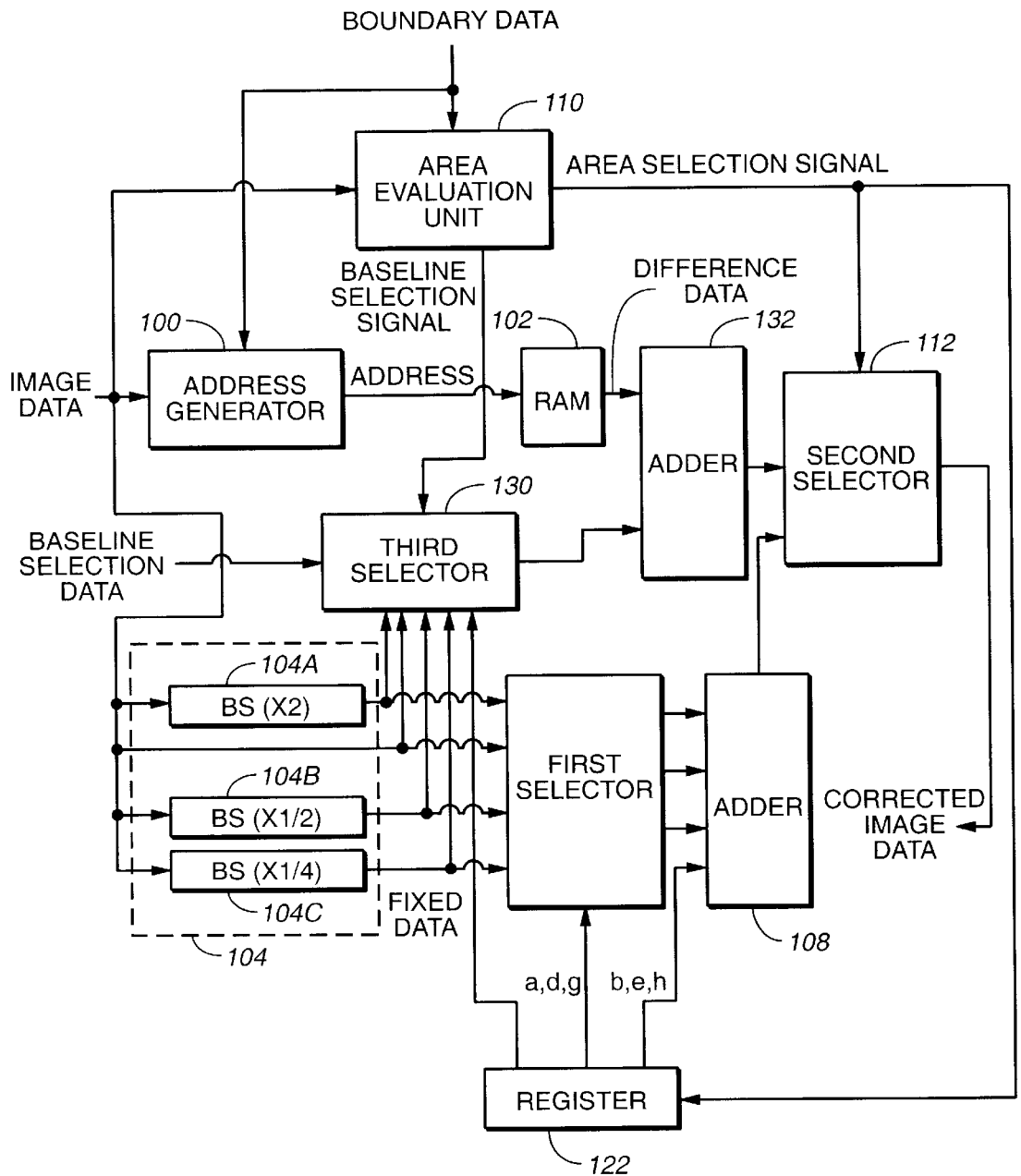
FIG._10

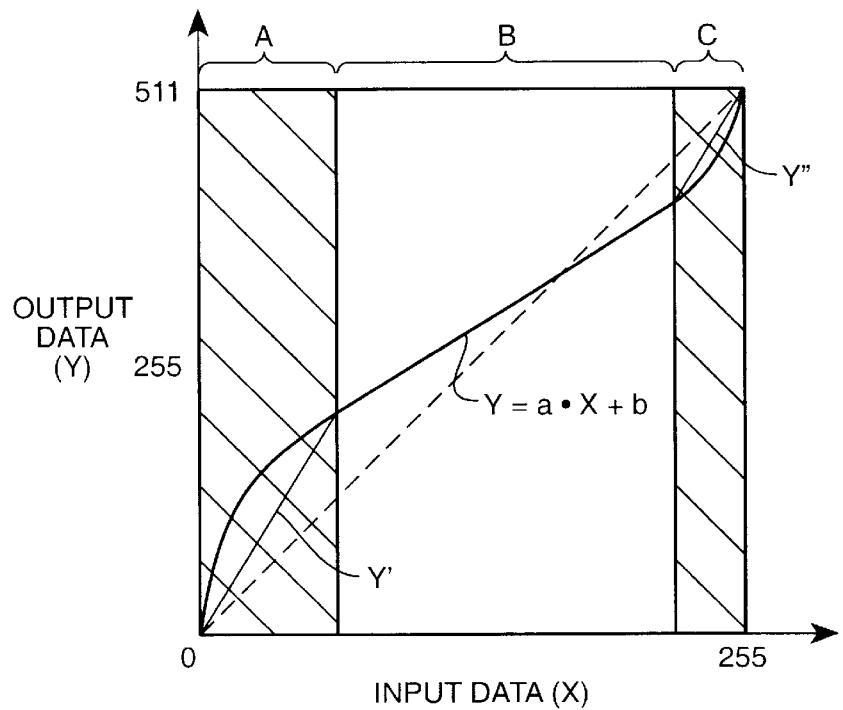
FIG._11
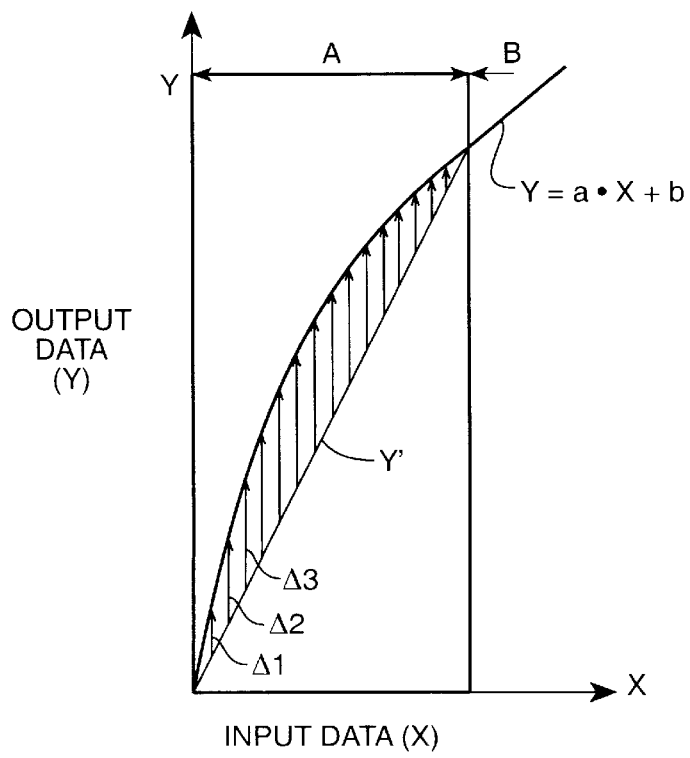
FIG._12

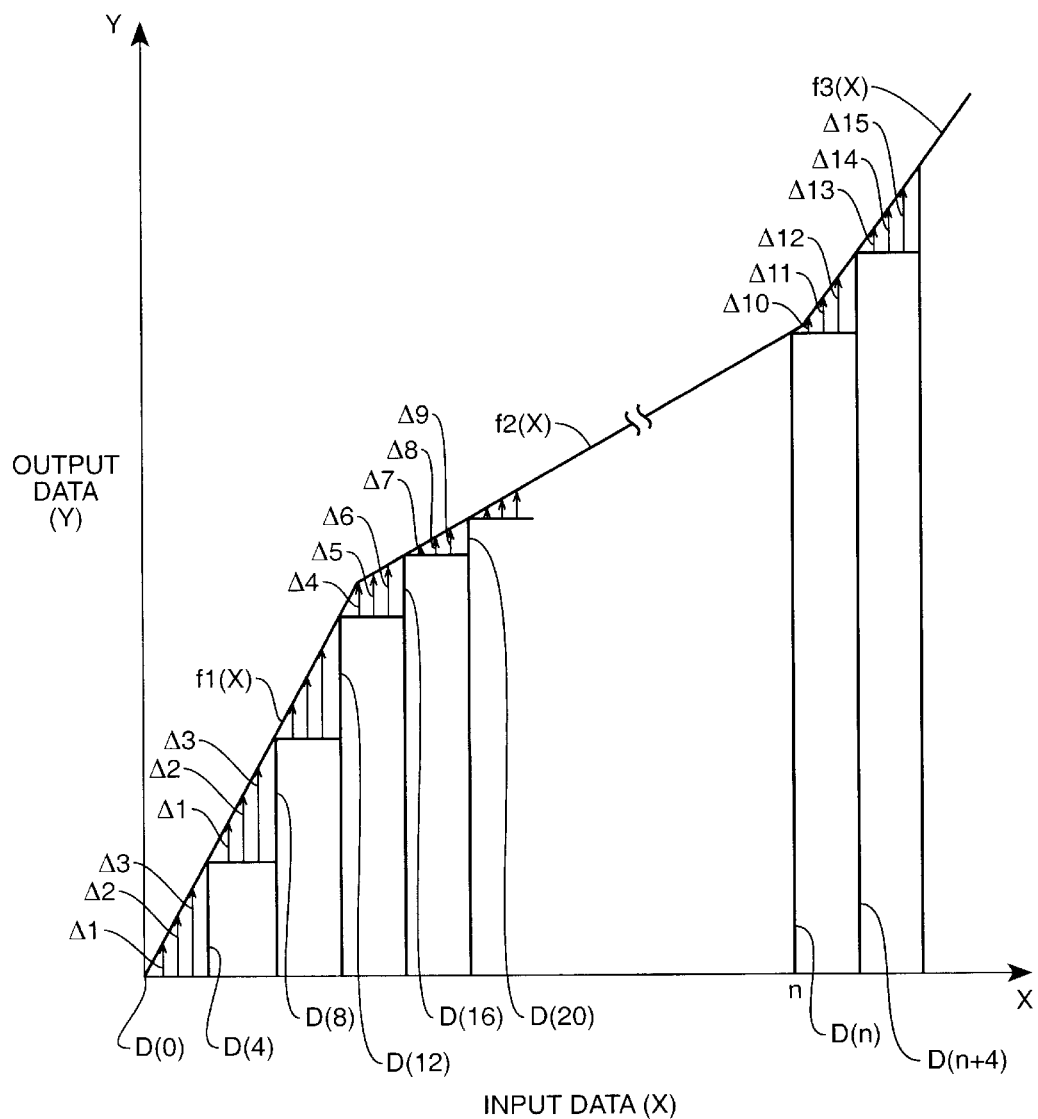
FIG._14

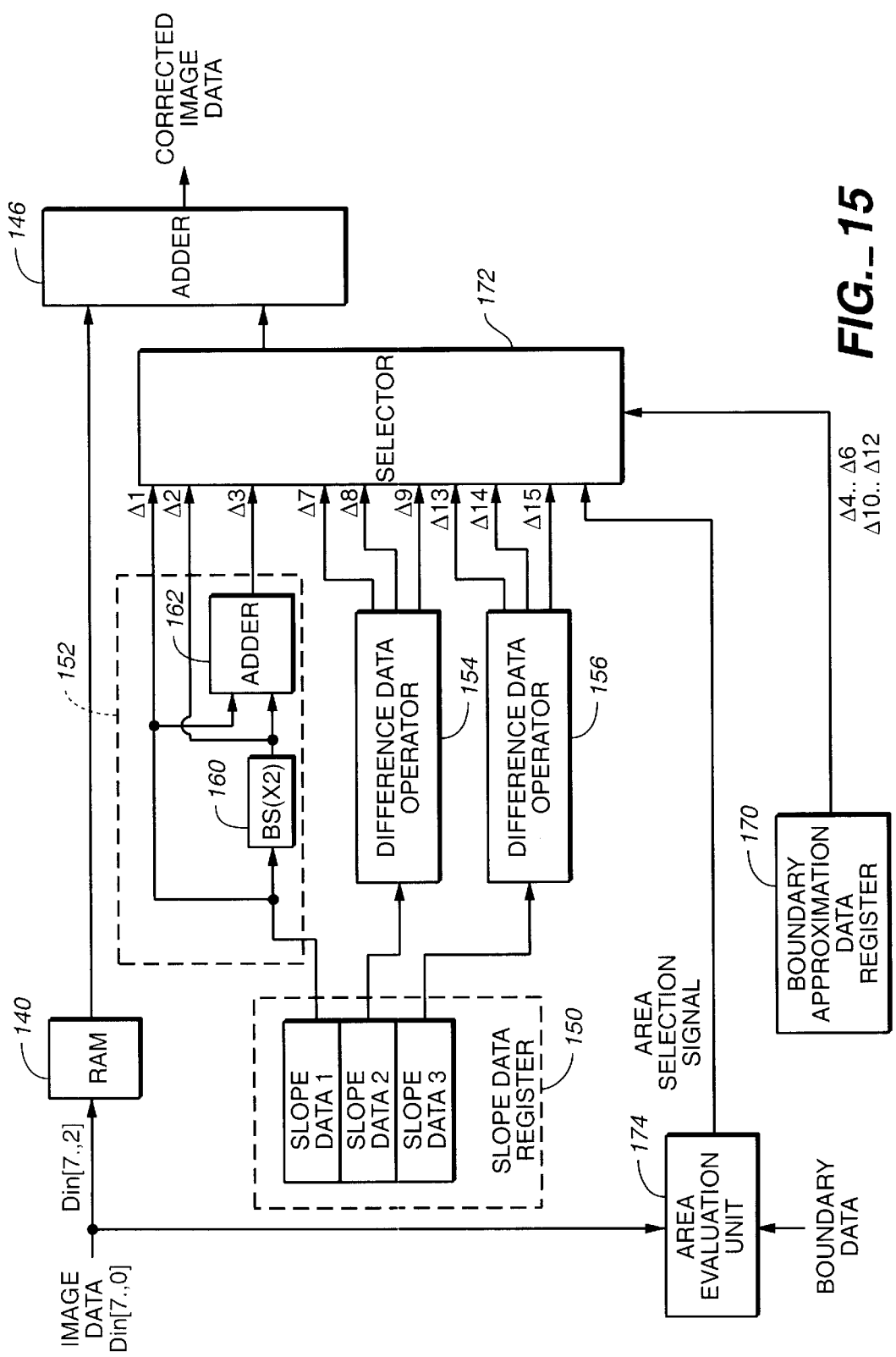
FIG._15

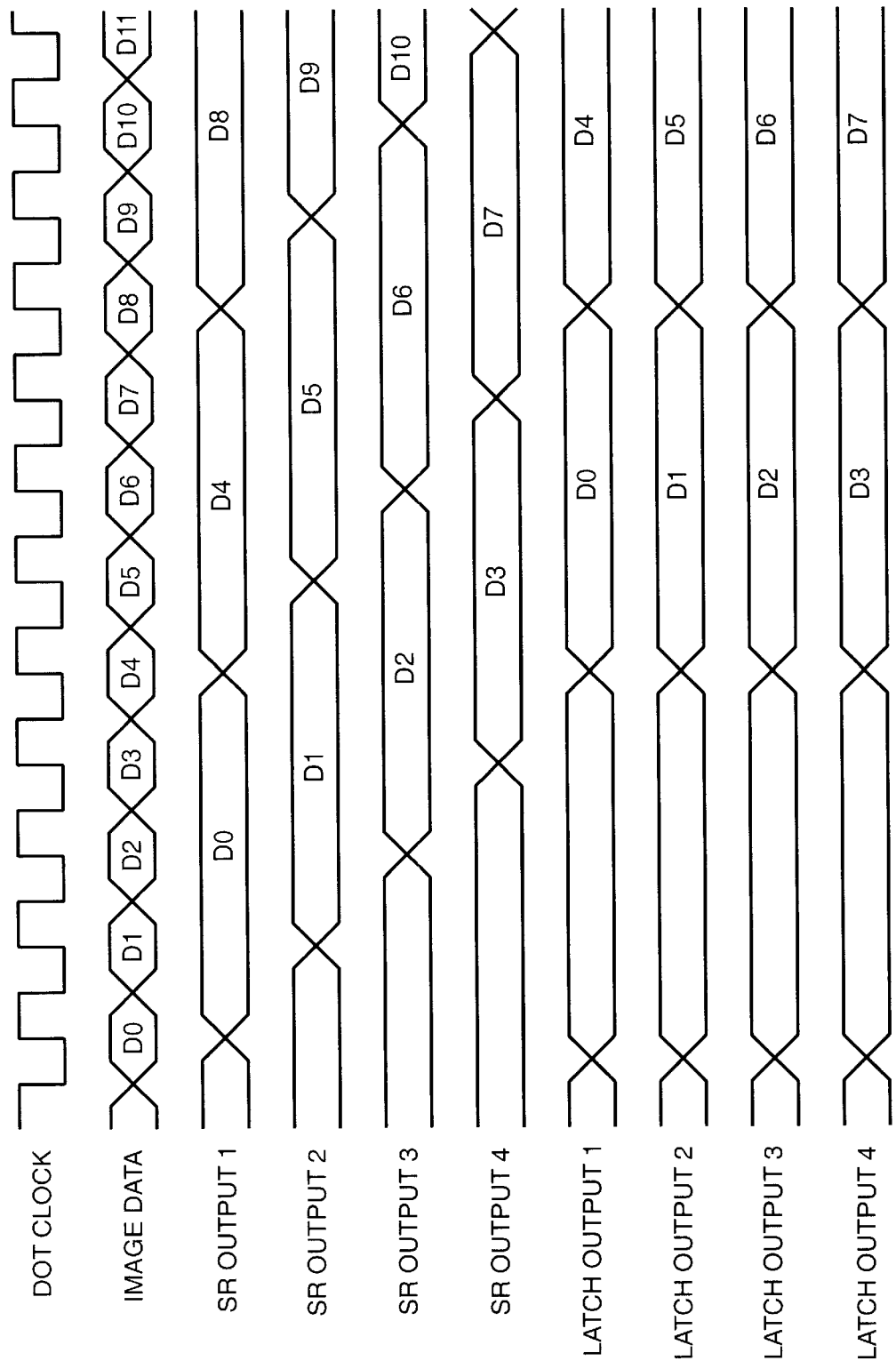
FIG._16

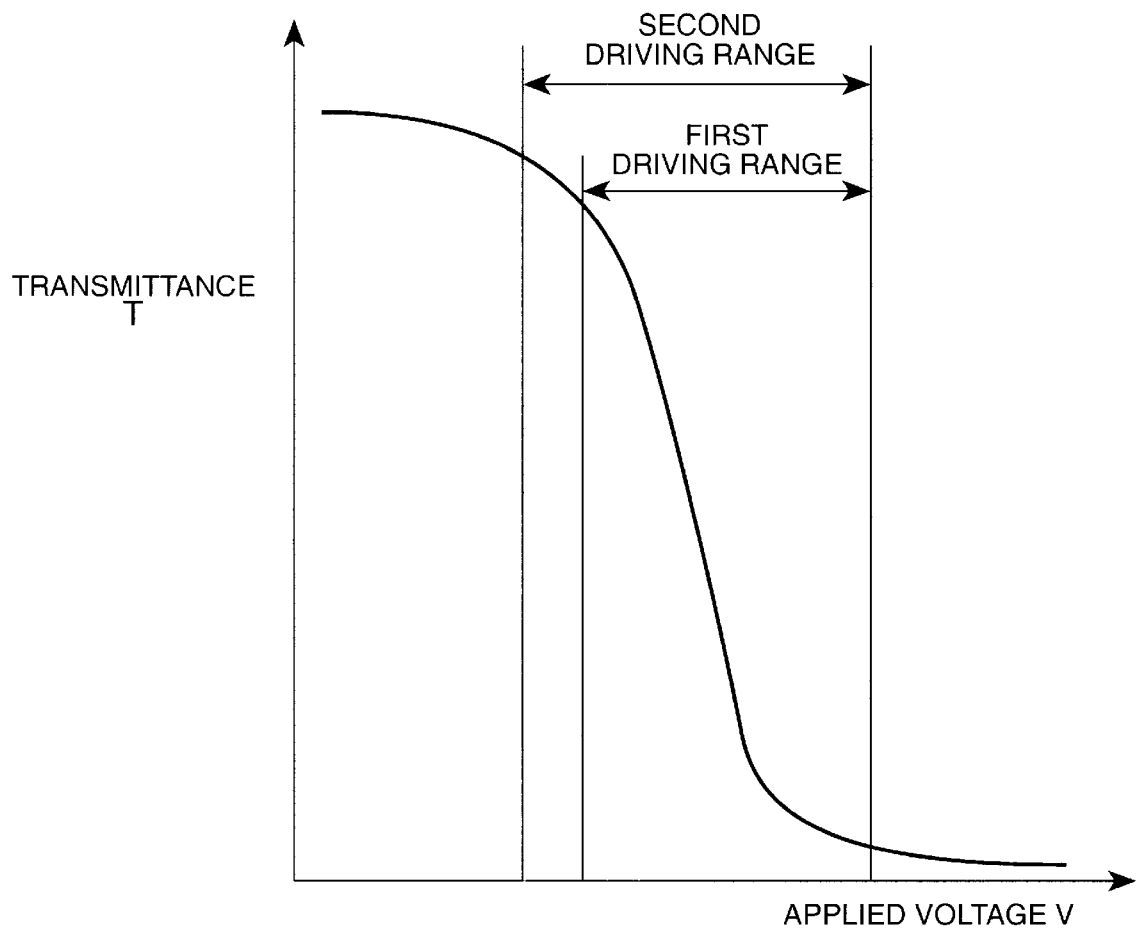
FIG._17

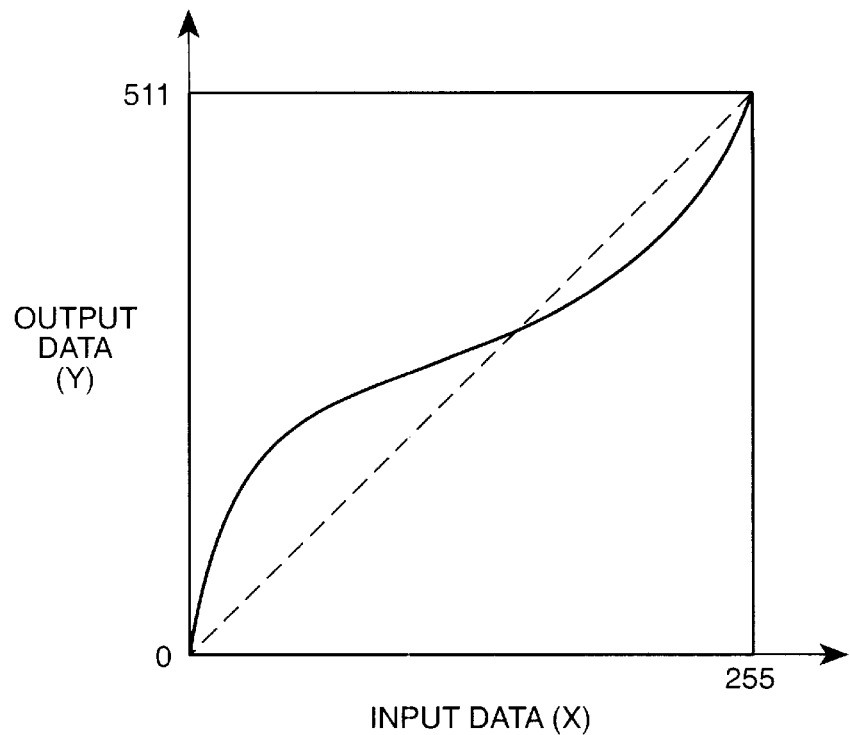
FIG._18
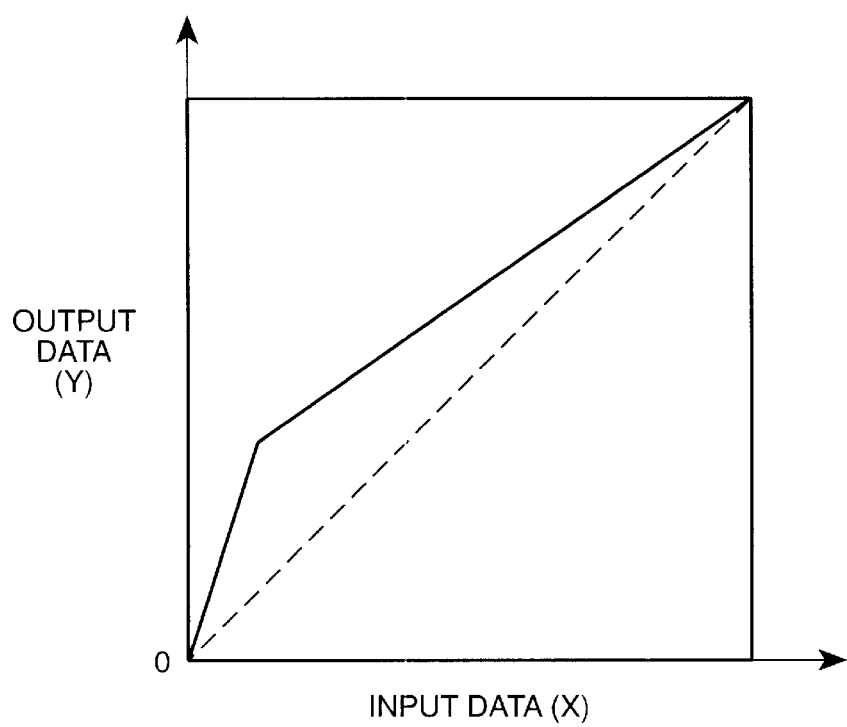
FIG._19

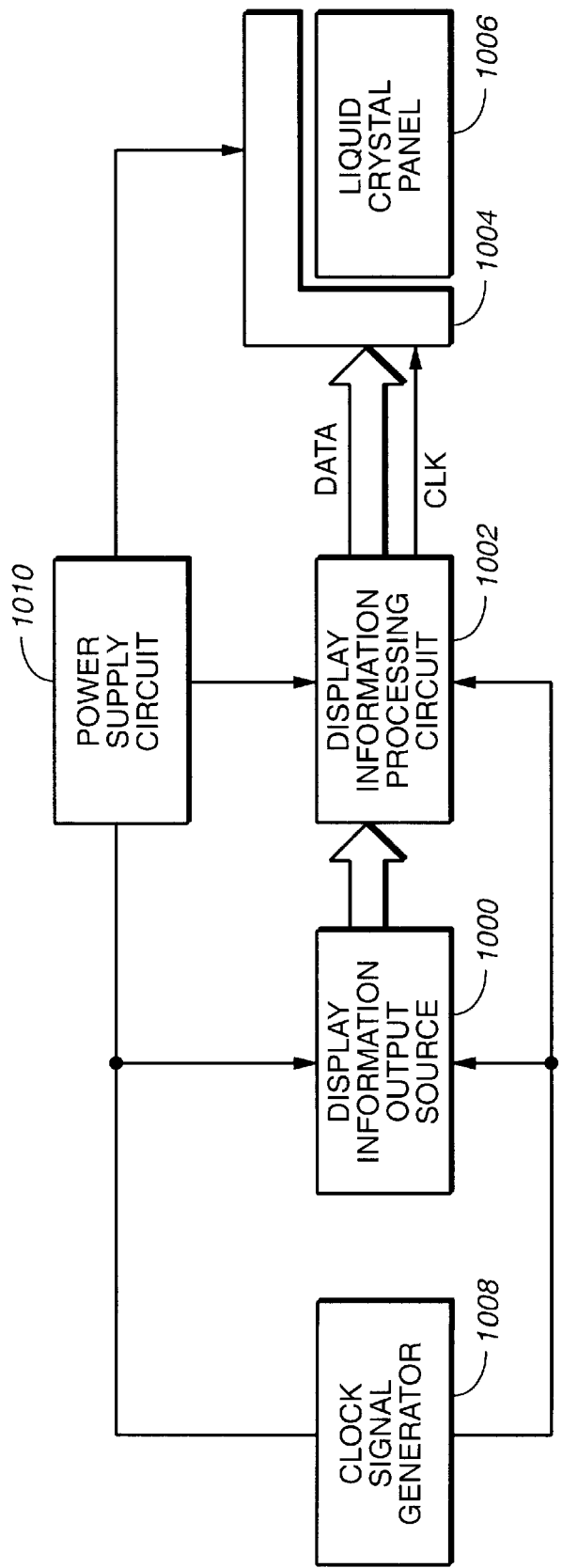
FIG._20

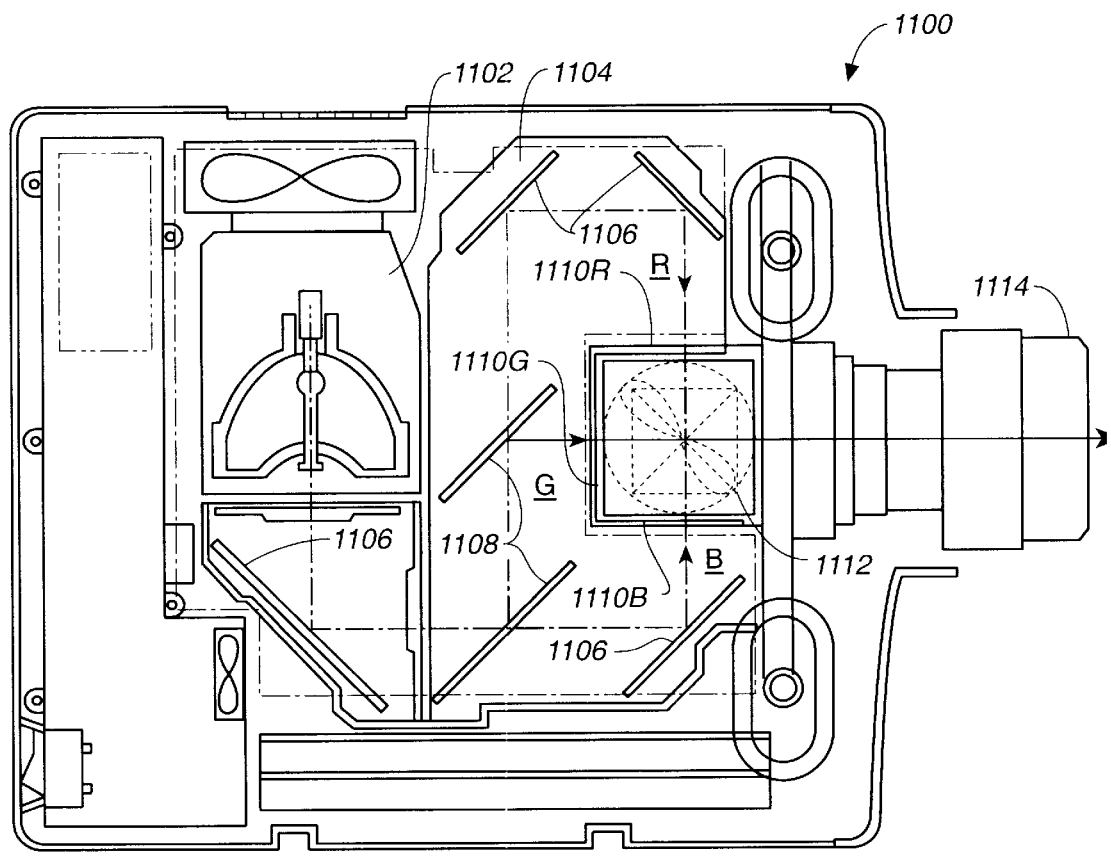
FIG._21
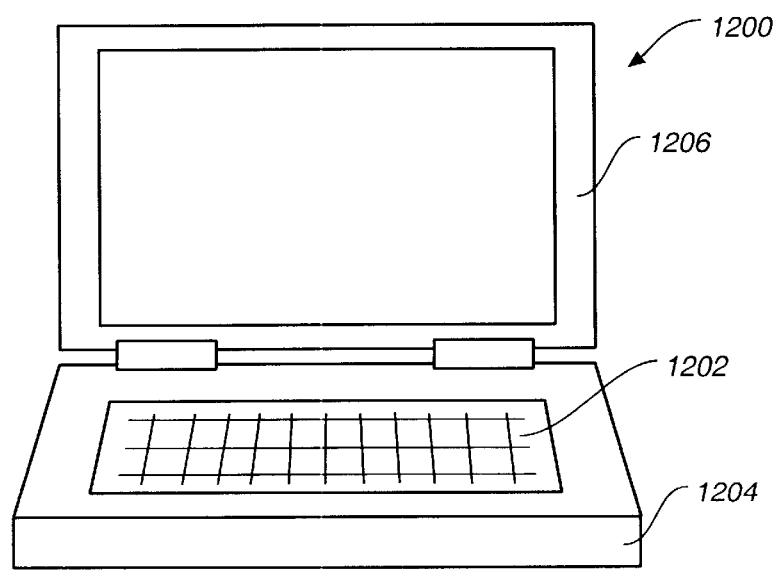
FIG._22

DIGITAL GAMMA CORRECTION CIRCUIT, GAMMA CORRECTION METHOD, AND A LIQUID CRYSTAL DISPLAY APPARATUS AND ELECTRONIC DEVICE USING SAID DIGITAL GAMMA CORRECTION CIRCUIT AND GAMMA CORRECTION METHOD

The present invention relates to a digital gamma correction circuit for correcting input digital image data to digital image data adjusted to the applied voltage-transmittance characteristic of a liquid crystal display unit, and to a liquid crystal display apparatus and electronic device using said digital gamma correction circuit. More specifically, the invention relates to gamma correction for correcting image data that has been gamma corrected for a particular characteristic, for example, for a CRT, to the characteristics of a liquid crystal display unit.

REALATED ART

Thin liquid crystal display panels are increasingly used as a replacement for the relatively large CRTs that have been conventionally used for the image display units of electronic devices. As shown in FIG. 17, the transmittance-voltage (T-V) characteristic, which is determined by the relationship between applied voltage V and transmittance T, is non-linear in a liquid crystal display panel. The change in transmittance T relative to a change in applied voltage V is particularly small near the black level where gradation is low. As a result, the change in gradation (light transmittance T) drops relative to a change in the image data (applied voltage V) near the black level, and resolution at this level therefore drops. Correction to correct this and obtain appropriate resolution at all levels is known as "gamma correction" in a liquid crystal display unit.

The same phenomenon of the relationship between input signal voltage and light-emitting output not being linear also occurs in a CRT containing a television receiver. As a result, a TV signal transmitted in the NTSC format, for example, has already been gamma corrected for a CRT at the imaging camera stage, for example. As a result, gamma correction by a television receiver using a CRT is not necessary.

A method for accomplishing digital gamma correction in the imaging camera is known from the literature. Examples of gamma correction using linear approximation in the imaging camera are disclosed in Japanese Patent No. 2542864, and Japan Unexamined Patent Publication (kokai) H8-32837 (1996-32837). Using a linear approximation calculation and memory to accomplish digital gamma correction in the imaging camera is disclosed in Japan Unexamined Patent Publication (kokai) H2-230873 (1990-230873).

For displaying images on a liquid crystal display panel based on a TV signal, gamma correction for a CRT is rather unnecessary, and gamma correction to match the T-V characteristic of the liquid crystal display panel is ultimately required.

Applying gamma correction based on a TV signal at the time of image display in a projector using a liquid crystal display panel as a light valve is disclosed in Japan Unexamined Patent Publication (kokai) H8-186833 (1996-186833). In this publication, however, there is no clear disclosure concerning gamma correction for TV signals which have already been gamma corrected for a CRT, and the gamma correction below is accomplished in the analog domain. As a result, developing an integrated circuit device for a liquid crystal drive circuit containing a gamma correction circuit has not been possible.

This analog gamma correction is accomplished using diodes and other devices based on the single breakpoint gamma correction characteristic shown in FIG. 19.

Individual variance in diode characteristics, however, makes the adjustment needed to achieve a uniform characteristic in each liquid crystal display apparatus complicated. In addition, when a total of three liquid crystal display panels, for red, green, and blue, are used in a single device, such as a color projector, it is also necessary to adjust the three liquid crystal display panels to each other, and this adjustment is complicated.

Moreover, with the single breakpoint gamma correction characteristic shown in FIG. 19, gamma correction is only possible in the black level region of the T-V characteristic shown in FIG. 17 and correction in this black level region also depends upon linear approximation. As a result, there is a self-imposed limit on the ability to ensure accurate gamma correction matching the T-V characteristic.

It should be here noted that of the data processing and liquid crystal drive circuits needed for a liquid crystal display, the liquid crystal display apparatus is preferably comprised with only the liquid crystal drive circuit below specific to driving a liquid crystal display mounted on a liquid crystal drive board assembled with the liquid crystal display panel. This is because this liquid crystal display apparatus is provided for use in projectors, personal computers, and various other electronic devices, and the general utility of the circuit is thus increased. Furthermore, this is also preferable because inspection of the liquid crystal drive board and liquid crystal display panel can then be inspected as a single assembly. To reduce the size of these, a majority of the circuits on the boards dedicated to the liquid crystal display must be reduced to integrated circuits.

An object of the present invention is therefore to provide a gamma correction method and a digital gamma correction circuit, as well as a liquid crystal display apparatus and electronic device using said method and circuit, enabling digital processing including gamma correction matching the specific T-V characteristic of individual liquid crystal display panels, and enabling high precision gamma correction even in regions where the specific T-V characteristic of a liquid crystal display panel varies on a curve.

A further object of the present invention is to provide a gamma correction method and a digital gamma correction circuit, as well as a liquid crystal display apparatus and electronic device using said method and circuit, whereby the drive range is expanded in the high transmittance region of the specific T-V characteristic of a liquid crystal display panel, thereby increasing the contrast ratio of the liquid crystal display screen and increasing the S/N ratio.

Yet a further object of the present invention is to provide a liquid crystal display apparatus and electronic device whereby the storage capacity of the memory table for digital gamma correction can be reduced, power consumption is reduced, and semiconductor integration of the liquid crystal drive circuit is possible.

Yet a further object of the present invention is to provide a gamma correction method and a digital gamma correction circuit and a correction method whereby all data processing, including gamma correction to match the specific T-V characteristics of individual liquid crystal display panels, applied to an image signal to which gamma correction for particular characteristics, such as gamma correction for a CRT, is digitally processed, and adjustment of the gamma correction content according to the specific T-V characteristics of individual liquid crystal display panels is simple.

Yet a further object of the present invention is to provide a gamma correction method and a digital gamma correction circuit capable of applying gamma correction to match the specific T-V characteristics of individual liquid crystal display panels to image signals which have not been gamma corrected for particular characteristics as well as image signals that have been gamma corrected for particular characteristics.

Yet a further object of the present invention is to provide a gamma correction method and a digital gamma correction circuit whereby the contrast ratio or brightness of the liquid crystal display screen can be adjusted using a memory table for digital gamma correction.

SUMMARY OF THE INVENTION

A digital gamma correction circuit according to claim 1 of the present invention for correcting digital image data that has been gamma corrected for a particular characteristic to digital image data suitable for driving a display on a liquid crystal display comprises a first digital gamma correction circuit for applying a first digital gamma correction including reverse gamma correction for effectively restoring digital image data gamma corrected for the particular characteristic to the digital image data before gamma correction for the particular characteristic, and a second digital gamma correction circuit for applying a second digital gamma correction based on an applied voltage-transmittance characteristic of the liquid crystal display to digital image data either before or after gamma correction for the particular characteristic.

With the invention according to claim 1, gamma correction for a CRT or other gamma correction for the particular characteristic is removed by the first digital gamma correction circuit, and gamma correction for the specific applied voltage-transmittance characteristic of a liquid crystal display panel is performed by the second digital gamma correction. It is not always necessary to consider the characteristics of each individual liquid crystal display panel in the first digital gamma correction circuit, and the characteristics thereof can be determined separately of the second digital gamma correction circuit. In addition, while the correction data of the second digital gamma correction circuit is often changed according to the characteristics of individual liquid crystal panels, this change does not necessarily affect the first digital gamma correction circuit, and changed data can be easily obtained.

In the invention according to claim 2, the first digital gamma correction circuit is disposed on the upstream side of the second digital gamma correction circuit, and a bypass line is further provided for carrying digital image data to which gamma correction for the particular characteristic has not applied to the second digital gamma correction circuit without passing through the first digital gamma correction circuit.

Thus comprised, CD-ROM output, computer output, and other image data with a linear characteristic can be appropriately gamma corrected using only the second digital gamma correction circuit.

In the invention according to claim 3, the first digital gamma correction circuit comprises a first memory table for storing correction data for the entire gradation range.

With this first gamma correction, input and output can be set to the same bit; as a result, gamma correction can be easily accomplished by means of memory access only without significantly increasing memory capacity.

The invention according to claims 4 and 5 is characterized by the data stored to the first memory table containing the contrast ratio adjustment data or brightness adjustment data which changes when the contrast ratio or brightness of an image driven for display on a liquid crystal display unit is adjusted.

When thus comprised, contrast ratio or brightness adjustment across the entire gradation range can be accomplished at the same time as the first gamma correction.

The invention according to claim 6 through claim 12 defines various configurations of the second digital gamma correction circuit, simplifying circuit configuration, reducing memory capacity, or enabling the second digital gamma correction circuit to be built in to an integrated circuit.

The invention according to claims 13 and 14 defines a liquid crystal display apparatus and electronic device containing the above-noted digital gamma correction circuit, enabling by means of this apparatus and device a liquid crystal display with outstanding image quality corrected for the applied voltage-transmittance characteristic of a liquid crystal display panel.

A digital gamma correction circuit according to claim 15 of the invention for correcting input digital image data to digital image data suited to driving a liquid crystal display unit comprises range evaluation unit for determining whether a gradation of the input digital image data belongs to a first range on a low gradation side, a second range on a high gradation side, and a third ranges between said first and second ranges; a memory table for storing correction data for input digital image data associated with the first and second ranges, and reading correction data for the input digital image data; and a linear approximation operator for correcting input digital image data associated with the third range by means of a linear approximation calculation based on a single line having a specific slope and offset.

The invention according to claim 15 can thus read the correction data from an applied voltage-transmittance curve for the liquid crystal display panel to enable gamma correction when gradation of the input image data is low and the image data is associated with the first range, and when gradation of the input image data is high and the image data is associated with the second range. High precision gamma correction can therefore be achieved in the first and second ranges even when the rate of change in the applied voltage-transmittance characteristic of the liquid crystal display panel is varied. In addition, gamma correction based on a linear approximation is applied in the third range between the first and second ranges because the rate of change in the applied voltage-transmittance characteristic of the liquid crystal display panel is substantially constant. Therefore, the capacity of the memory table can be reduced when compared with gamma correction of the full gradation range using only a memory table.

Moreover, when compared with gamma correction in the second range by means of linear approximation, high precision gamma correction using a memory table can be accomplished even when the gamma correction range is expanded to a higher transmittance range where the rate of change in the applied voltage-transmittance characteristic of the liquid crystal display panel is not uniform. As a result, the driving range of the liquid crystal display panel can be expanded, the contrast ratio improved, and the S/N ratio increased.

The invention according to claim 16 is that according to claim 15 wherein the linear approximation operator comprises a plurality of bit shifters for bit shifting input digital image data and multiplying the input digital image data by $2^n$ or $\frac{1}{2}^n$ where n is a natural number; a selector for selecting and outputting the output from at least one of said plurality of bit shifters according to the slope data of at least one line; and a first operator for adding or subtracting the offset data of at least one line to the selector output.

When the linear approximation operator comprises a plurality of bit shifters for bit shifting input image data as described in claim 16, the circuit configuration for multiplying the slope of a line is simplified, and one of a plurality of slope types can be selected for linear approximation calculation by causing the selector to select from among a plurality of bit shifter outputs. The offset data is also added to or subtracted from the selector output by a first operator.

The invention according to claim 17 is that according to claim 16 wherein the linear approximation operator obtains a linear approximation in each of a plurality of linear approximation regions using a plurality of lines in the third range; the linear approximation operator further comprises a register for storing a plurality of slope data and a plurality of offset data; and the range evaluation unit compares boundary data for each linear approximation region with the input digital image data to control reading the corresponding slope data and offset data for the linear approximation region from the register.

With the invention according to claim 17, a linear approximation in the third area can be accomplished using lines that differ in a plurality of linear approximation regions, and gamma correction precision in these third ranges can be further improved.

The invention according to claim 18 is that according to claim 16 or 17 wherein the gamma correction data for the first and second ranges is separated into base line data positioned on at least one base line in the first and second ranges, and difference data in the first and second ranges that is added to or subtracted from at least one of the base line data; the memory table stores the difference data for the first and second ranges; the linear approximation operator outputs the base line data in the first and second ranges; and a second operator is further comprised for adding or subtracting the difference data output from the memory table and the base line data output from the linear approximation operator.

With the invention according to claim 18, only the difference data is stored in the memory table, and the memory table capacity can therefore be further reduced.

The invention according to claim 21 is a gamma correction method for correcting digital image data that has been gamma corrected for a particular characteristic to digital image data suitable for display driving in a liquid crystal display unit, said gamma correction method comprising a step for applying a first digital gamma correction including a reverse gamma correction for effectively restoring digital image data that has been gamma corrected for the particular characteristic to the digital image data before gamma correction for the particular characteristic; and a step for applying a second digital gamma correction based on an applied voltage-transmittance characteristic of the liquid crystal display unit to said digital image data either before or after said gamma correction for the particular characteristic.

The invention according to claim 22 is characterized by a first digital gamma correction circuit whereof correction data stored to a first memory table for storing correction data across the entire gradation range includes contrast ratio adjustment data which changes when the contrast ratio of an image driven for display to a liquid crystal display unit is adjusted.

The invention according to claim 23 is the invention according to claim 21 wherein correction data stored to a first memory table includes brightness adjustment data which changes when the brightness of an image driven for display to a liquid crystal display unit is adjusted.

BRIEF DESCRIPTION OF THE DRAWINGS

FIG. 1 is a block diagram of a data processing and liquid crystal display drive circuit for driving a liquid crystal display panel according to an embodiment of the present invention appropriate for a projector.

FIG. 2 is a graph of primary gamma correction data characteristics stored to a RAM table of a primary gamma correction circuit.

FIG. 3 is a graph for describing the primary gamma correction data containing contrast ratio adjustment data that is rewritten in the RAM table of a primary gamma correction circuit.

FIG. 4 is a graph for describing the primary gamma correction data containing brightness adjustment data that is rewritten in the RAM table of a primary gamma correction circuit.

FIG. 5 is a block diagram of a liquid crystal display drive IC mounted on the dedicated liquid crystal circuit board shown in FIG. 1.

FIG. 6 is a graph of secondary gamma correction data characteristics stored to a RAM table of the secondary gamma correction circuit shown in FIG. 5.

FIG. 7 is a block diagram of a configuration for rewriting data in a RAM table of the primary or secondary gamma correction circuit.

FIG. 8 is a block diagram of an alternative embodiment of the secondary gamma correction circuit shown in FIG. 5 for performing a linear approximation calculation using a plurality of lines.

FIG. 9 (A) and (B) are graphs showing the secondary gamma correction characteristic used by the circuit shown in FIG. 8.

FIG. 10 is a block diagram showing an alternative embodiment of the secondary gamma correction circuit shown in FIG. 5 whereby only difference data is stored to RAM.

FIG. 11 is a graph showing the secondary gamma correction characteristics used by the circuit in FIG. 10.

FIG. 12 is a graph enlarging FIG. 11 all or in part to describe the relationship between the base line and difference data.

FIG. 13 is a block diagram showing an alternative embodiment of a secondary gamma correction circuit whereby linear approximation for secondary gamma correction is accomplished using RAM and a register.

FIG. 14 is a graph showing the secondary gamma correction characteristics of the circuit FIG. 13.

FIG. 15 is a block diagram of another secondary gamma correction circuit using the secondary gamma correction characteristics in FIG. 14.

FIG. 16 is a timing chart used to describe the operation with the phase expansion circuits of FIG. 1 and FIG. 5.

FIG. 17 is a graph showing the applied voltage-transmittance (T-V) characteristic of a liquid crystal display panel.

FIG. 18 is a graph showing an ideal secondary gamma correction characteristic for correcting the T-V characteristic shown in FIG. 17.

FIG. 19 is a graph showing the analog gamma correction characteristic using a conventional single breakpoint linear approximation.

FIG. 20 is a block diagram of an electronic device according to the present invention.

FIG. 21 is a simplified cross sectional diagram of a color projector exemplary of an electronic device according to the present invention.

FIG. 22 is a simplified perspective view of a personal computer exemplary of an electronic device according to the present invention.

The references used in the accompanying figures are as shown below.

10 signal processing board
12, 14 input terminals
16 AD converter
18 digital decoder
20 frame memory
22 switch
24 primary gamma correction circuit (first digital gamma correction circuit)
24 RAM (first memory table)
30R, 30G, 30B dedicated liquid crystal display boards
32 secondary gamma correction circuit (second digital gamma correction circuit)
34 phase expansion circuit
36 polarity inversion circuit
38 DA converter
40 amplifier
42 buffer
50R, 50G, 50B liquid crystal display panels
100 address generator
102 RAM (second memory table)
104A, 104B bit shifters
106 first selector
108 adder (first operator)
110 range evaluation unit
112 second selector
120 comparator
122 register
130 third selector
132 adder (second operator)
140 RAM (second memory table)
142 register address generator
144 difference data register (third memory table)
146 adder
150 slope data register (third memory table)
152 difference data calculator
160 bit shifter
162 adder
170 boundary approximation data register
172 selector
174 range evaluation unit

DETAILED DESCRIPTION OF PREFERRED EMBODIMENTS

The preferred embodiments of the present invention shown in the accompanying figures are described in further detail below.

General Description of a Data Processing Circuit

FIG. 1 is a block diagram in brief of a data processing and liquid crystal display drive circuit for driving a liquid crystal display panel. The present embodiment shown in FIG. 1 is suitable for a projector in which three liquid crystal display panels are used as light valves for red, blue, and green. It should be noted that in the present embodiment the three liquid crystal display panels are configured on an active matrix circuit board using TFT for switching elements, but other liquid crystal display circuit boards can also be used.

The liquid crystal display apparatus for this projector shown in FIG. 1 comprises, in general groups, a signal processing board 10 shared for data processing each color red, green, and blue; dedicated liquid crystal display boards 30R, 30G, and 30B disposed for each color R,G, and B; and liquid crystal display panels 50R, 50G, and 50B functioning respectively as thee light valves.

In addition to the various circuits (not shown in the figure) for a projector that is the electronic device of the present embodiment, the signal processing board 10 can be a circuit board for overall control on which elements and circuits achieving the following functions are mounted. A first input terminal 12 for inputting an NTSC, PAL, or other analog television signal, and a second input terminal 14 for inputting a computer output, CD-ROM output or other digital image signal, are comprised as image data input terminals. The analog television signal input to the first input terminal 12 has been gamma corrected with respect to CRT characteristics, but gamma correction has not been applied to the digital image signal input to the second input terminal 14. It should be noted, however, that a further terminal for inputting a digital image signal that has been gamma corrected for a CRT by a CCD camera, for example, can be provided.

An AD converter 16 is connected to first input terminal 12, and converts an analog television signal to a digital signal. The AD converter 16 is also connected to digital decoder 18. This digital decoder 18 decodes the luminance signal Y and color difference signals U and V in the television signal to the tricolor R, G, and B signals.

A frame memory 20 is disposed following digital decoder 18. Data input through first input terminal 12 passes AD converter 16 and digital decoder 18, and is written one frame at a time to frame memory 20. Digital R, G, B data input from second input terminal 14 is written directly to frame memory 20. It should be noted that when interlaced scanning is used on liquid crystal display panels 50R, 50G, 50B, the R, G, B data for one frame is read separated into two fields in odd line, even line sequence from the frame memory 20.

A primary gamma correction circuit 24 is connected via a switch 22 on the downstream side of frame memory 20. When the data from the frame memory 20 is data input by means of the first input terminal 12, this switch 22 outputs the data to the primary gamma correction circuit 24. R, G, B digital image data, which is CCD camera output as noted above, is also input to the primary gamma correction circuit 24 in the same manner. On the other hand, when the data from frame memory 20 is data input via second input terminal 14, switch 22 supplies the data via bypass line 26 directly to dedicated liquid crystal display boards 30R, 30G, 30B without supplying that data to the primary gamma correction circuit 24. It should be noted that primary gamma correction circuit 24 is described in detail below.

Dedicated liquid crystal display board 30R and liquid crystal display panel 50R are described next below with reference to FIG. 5. FIG. 5 is a block diagram of a liquid crystal driver IC mounted on dedicated liquid crystal display board 30R. Note that the liquid crystal driver ICs for the other colors, green and blue, are configured identically to that for red.

A secondary gamma correction circuit 32 is disposed to dedicated liquid crystal display board 30R. This secondary gamma correction circuit 32 is also described in detail below.

A phase expansion circuit 34 is disposed downstream of secondary gamma correction circuit 32. This phase expansion circuit 34 performs a phase expansion of the data to reduce the drive frequency of the liquid crystal display panel 50R. To accomplish this, it comprises a shift register 200 and latch circuit 202 as shown in FIG. 5. For convenience of the following description, a 4-phase expansion using N=4 is shown in FIG. 5. The operation of the phase expansion circuit 34 shown in FIG. 5 is described with reference to the timing chart in FIG. 16.

Data for each pixel is input in time series sequence referenced the dot clock shown in FIG. 16 to the phase expansion circuit 34. As shown in FIG. 16, the output from shift register 200 separates the red data output into N lines, allocates the data for pixels 0, 0+N, 0+2N, and so on to a first output line, allocates the data for pixels 1, 1+n, 1+2N, and so on to a second output line, and likewise allocates pixel data to the remaining two output lines. This makes it possible to convert the time of pixel data on each output line to N-times the time of the original data. This is called an "N phase expansion." Because the time of the data for each pixel is thus lengthened, the sampling frequency of data sampling by liquid crystal display panel 50R is 1/N, and the sampling frequency can thus be adjusted to the response of the switching elements, which is a particular consideration when the pixel density of the liquid crystal display panel is high. It should be noted that if phase expansion is not applied when the liquid crystal display panel 50R is a high pixel density device known as an XGA display, the data sampling frequency of the liquid crystal display panel is a high 65-MHz frequency, which exceeds the response characteristic of a TFT. As a result, a 12 phase expansion where N=12 is applied to lower the sampling frequency to a frequency compatible with TFT response. In the case of VGA and SVGA devices having a lower pixel density, a 6 phase expansion where N=6 is used to obtain a sampling frequency compatible with TFT response.

In the present embodiment, data on the four output lines corresponding to a 4 phase expansion is latched at the same timing by latch circuit 202. As a result, the output from latch circuit 202 is as shown in FIG. 16, and the phase of data on each output line is thus aligned. It should be noted that the data on each of the four output lines can be sampled by the liquid crystal display panel 50R at the same or different timing without providing latch circuit 202.

A polarity inversion circuit 36 is disposed downstream of phase expansion circuit 34. This polarity inversion circuit 36 is provided for inverting the polarity of the field applied to the liquid crystals of each pixel in liquid crystal display panel 50R at a predetermined cycle to enable reversed polarity drive. Because TFT are used as the switching elements in a liquid crystal display panel according to the present embodiment, the polarity of the data potential supplied to a pixel is inverted referenced to the potential of a common electrode formed on a substrate opposing the TFT substrate to drive the panel.

Processing digital data for the purpose of this polarity inversion can be accomplished by inverting the digital data logic. To achieve this, polarity inversion circuit 36 comprises, as shown in FIG. 5, four inverters 210A to 210D for inverting the data logic on the four output lines, and four selectors 212A to 212D for selecting and outputting the data either before or after inversion. When the panel is driven with polarity inverted every other pixel, the preinversion data is selected by, for example, first and third selectors 212A and 212C, and the inverted data is selected by second and fourth selectors 212B and 212D.

A DA converter 38 comprising four converters 38A to 38D is disposed downstream of polarity inversion circuit 36, and digital-analog converts the phase-expanded, polarity-inverted data for N lines. This analog signal is the output of the liquid crystal display drive IC.

It should be noted that a timing signal generating circuit 220 is provided in the liquid crystal display drive IC, and timing signals required by the above-noted phase expansion circuit 34, polarity inversion circuit 36, and DA converter 38 are generated based on an image synchronization signal.

As shown in FIG. 1, dedicated liquid crystal display board 30R further comprises an amplifier 40 and buffer 42. Data to which a bias voltage for positive or negative reversed polarity drive has been superposed by the amplifier, for example, operational amplifier 40, is passed through buffer 42 and supplied to liquid crystal display panel 50R. Based on this data, liquid crystal display panel 50R is reverse polarity driven at a specific cycle, for example, every dot or line.

Relationship Between Primary Gamma Correction and Secondary Gamma Correction

Gamma correction in the present embodiment is separated into two operations. The first gamma correction operation is referred to herein as "primary gamma correction," and the second correction operation is referred to as "secondary gamma correction." It should be noted, however, that because both operations are digital correction operations in the present embodiment, the same effect can be achieved when the correction sequence is reversed. However, mounting the secondary gamma correction circuit 32 on the dedicated liquid crystal display board 30R, 30G, 30B side as in the present embodiment simplifies the procedure described below for adjusting the liquid crystal display panel, and enables the circuits mounted on the dedicated liquid crystal display boards to be integrated.

Primary gamma correction of the present embodiment is the operation whereby reverse gamma correction is applied to restore image data that has been gamma corrected primarily for a CRT to the original data before gamma correction for a CRT. This primary gamma correction operation therefore differs from the secondary gamma correction operation described below in that the correction data can be determined with no relationship to the characteristics of an individual liquid crystal panel. The purpose of this primary gamma correction is only to remove gamma correction for a CRT; when image data that has not been gamma corrected for a CRT is input, bypass line 26 can be used as described above as it is not necessary to pass the primary gamma correction circuit 24. If image data that has been gamma corrected for a CRT is, however, always input, a further function for correction according to one region (the white level side, for example) of the T-V characteristic shown in FIG. 17 can be added to the primary gamma correction circuit 24. The primary gamma correction circuit 24 uses a RAM table, and can therefore accommodate an additional function by simply adding to the correction data stored in the RAM table.

The primary purpose of the secondary gamma correction circuit 32, however, is to implement gamma correction according to the T-V characteristic of individual liquid crystal display panels as shown in FIG. 17. Because this T-V characteristic differs for each liquid crystal display panel, it differs from primary gamma correction in that adjustment is always needed. Because the gamma correction data must therefore be changed to match individual liquid crystal display panels, correction content with a great need for change is implemented as secondary gamma correction separately from the correction (primary gamma correction) of which the primary objective is removing gamma correction for a CRT and therefore has little need for change. Moreover, the adjustment procedure is simplified by integrating this secondary gamma correction circuit 32 with the display panel mounted on a dedicated liquid crystal display board. In addition, by performing this secondary gamma correction having a great need for change separately from primary gamma correction, the calculations for changing the secondary gamma correction data are simplified, and high precision correction can be achieved.

Description of a Primary Gamma Correction Circuit

The primary gamma correction circuit 24 is described next in detail below with reference to FIG. 2.

FIG. 2 shows an example of conversion characteristics of primary gamma correction applied by primary gamma correction circuit 24; input data is shown on the horizontal axis, and output data is shown on the vertical axis, on a scale of 256 gradations (8 bits). Because gamma correction for a CRT (indicated by the dot-dash line in FIG. 2) has already been applied to the television signal input through a first input terminal, the object of this primary gamma correction is, as described above, to apply the primary gamma correction (reverse gamma correction) indicated by the solid line in FIG. 2 to the input television signal and thereby effectively restore the data before gamma correction for a CRT (the linear characteristic indicated by the dotted line in FIG. 2).

This primary gamma correction circuit 24 is configured in RAM storing correction data, which is accessed by specifying an address based on the input image data. More specifically, when data X on the horizontal axis in FIG. 2 is input, data Y stored at an address corresponding to an address generated according to the input data X is read from RAM, and primary gamma correction is applied. As a result, the image data after primary gamma correction has a substantially linear characteristic as indicated by the dotted line in FIG. 2.

The reason for mounting primary gamma correction circuit 24 on signal processing board 10 is as described below. That is, because the objective of primary gamma correction is as described above, the primary gamma correction can be implemented with no relationship to the characteristics of the liquid crystal display panel, and can therefore be manufactured and inspected without considering the characteristics of individual liquid crystal display panels.

In the present embodiment, however, the data in the RAM table constituting primary gamma correction circuit 24 can be rewritten for the relationship between the characteristics of the individual liquid crystal display panels SOR, G, B after the signal processing board 10 and the three dedicated liquid crystal display boards 30R, G, B are electrically connected. This RAM data rewriting operation can be accomplished in the factory adjustment process prior to product shipping, or it can be accomplished by the user operating a control unit. This RAM data rewriting operation is described later below.

Description of a Secondary Gamma Correction Circuit

An example of a secondary gamma correction circuit 32 shown in FIG. 1 is shown in FIG. 5. The correction characteristic of the secondary gamma correction applied by this secondary gamma correction circuit shown in FIG. 5 is shown in FIG. 6. The correction characteristic in FIG. 6 primarily corrects the T-V characteristic on the low gradation side, that is, the black level side, of the input digital image data. As a result, a gamma correction function for ranges outside the near-black level can be provided in the primary gamma correction circuit 24.

Also in FIG. 6, 256-level (8-bit) input data is shown on the horizontal axis, and 512-level (9-bit) output data is shown on the vertical axis. By thus outputting data at a bit count exceeding the bit count of the input data, this secondary gamma correction can achieve different gradations even in areas with little change. It should be noted that while the number of output data levels is 512 or twice the input data in the present embodiment, it is also possible to use, for example, 1024 levels or four times the number of input levels as necessary.

It should be noted that if the bit count of the output data is an integer multiple of the bit count of the input data and all of the output data is to be stored in RAM as is the correction data for primary gamma correction, the required RAM capacity increases, power consumption increases, and incorporating the RAM into an IC is made more difficult. In the present embodiment, therefore, only the output data for range A in FIG. 6 is stored to RAM, thereby reducing the required capacity.

As shown in FIG. 5, this secondary gamma correction circuit 32 broadly comprises a correction section 32A using the RAM used for secondary gamma correction in the hatched range A in FIG. 6, and a linear approximation correction operator 32B used for secondary gamma correction in the remaining area B in FIG. 6. The line in range B in FIG. 6 can be expressed as Y=a*X+b where a is the slope data, and value b of Y when X=0 is the offset data. Input data c located on the boundary between ranges A and B is called boundary data.

As shown in FIG. 5, this secondary gamma correction circuit 32 comprises an address generator 100 and RAM 102 as correction section 32A for secondary gamma correction in range A. The address generator 100 generates an address based on the input image data X, and correction data Y at the corresponding address in RAM 102 is read out. Because boundary data c is input to address generator 100, when image data of a value greater than boundary data c is input, an address is not generated by address generator 100. In this case, therefore, RAM 102 is not accessed, and power consumption can be accordingly reduced.

Secondary gamma correction circuit 32 further comprises, for example, three bit shifters 104A, 104B, and 104C for bit shifting the input image data, a first selector 106 for selecting the output of at least one bit shifter based on defined slope data a, and adder 108 for adding offset data b to the output of first selector 106, and calculating Y=a*X+b, as linear approximation correction operator 32B for applying secondary gamma correction in range B in FIG. 6. It should be noted that this adder 108 is configured as an operator that is capable of subtraction operations as required.

Bit shifter 104A shifts input image data X one bit higher, and outputs the value of 2*X. Bit shifter 104B shifts input image data X one bit lower, and outputs the value of (½)*X. Bit shifter 104C shifts input image data X two bits lower, and outputs the value of (¼)*X.

When the slope data a is ¼, ½, ¾,2,2+¼, or 2+¾, first selector 106 selects the corresponding one or plural outputs from bit shifters 104A to 104C.

Range evaluation unit 110 compares a value in the input image data with boundary data c, and determines the value to be in range A if $X_{13}$ c, and in area B if X<c. Based on the determination made by range evaluation unit 110, second selector 112 selects the output of RAM 102 when the value is determined to be in range A, and selects the output of adder 108 when the value is determined to be in range B.

In the present embodiment, correction data is obtained using RAM 102 for area A of FIG. 6 wherein the rate of change in the applied voltage-transmittance rate is not uniform, and using a linear approximation calculation for range B wherein the rate of change in the applied voltage-transmittance rate has a substantially uniform, near-linear characteristic. The T-V curve in FIG. 17, which shows the correlation between light transmittance T and the applied voltage V of the liquid crystal display panel, shows little change in transmittance with respect to a change in applied voltage in near-black level ranges having little gradation, and the objective of this secondary gamma correction is to prevent a resulting drop in resolution in these near-black level ranges. As a result, because only the correction data for range A is stored to RAM 102 in the present embodiment, the capacity of RAM 102 can be reduced and power consumption can be reduced, and RAM 102 can be incorporated in an IC.

Changing Secondary Gamma Correction Data

Because the characteristics of individual liquid crystal display panels differ, it is at least necessary to adjust the gamma correction data to the characteristics of the individual liquid crystal display panel before shipping from the factory. To enable this, therefore, an operating unit 300 for entering adjustment data, PROM 302 or other storage means for storing T-V characteristics of an individual panel, and CPU 304 for calculating various adjustment data based on information from operating unit 300 and PROM 302, are comprised as shown in FIG. 7. It should be noted that the operating unit 300, PROM 302, and CPU 304 are built in to an adjustment device located in the factory when this adjustment is only possible prior to shipping in the factory, but are mounted on the signal processing board 10, dedicated liquid crystal display board 30R, or other circuit board when user adjustment is possible. Operation is described separately for each of these cases below.

In the adjustment process prior to factory shipping with this device, the T-V characteristics of the individual liquid crystal display panels 50R, 50G, 50B are measured, and stored to PROM 302. Then, a specified pattern is displayed on liquid crystal display panels 50R, 50G, 50B, and observed and inspected visually either on said panels or on a projector screen with red, green, and blue merged.

To change the secondary gamma correction data in range A of FIG. 6 as a result of this inspection, it is only necessary to change the content of RAM 102 and data a, b, and c supplied to the linear approximation operator. A case in which a command for increasing gradation and the amount of change in range A in FIG. 6 are input by means of a rotary knob on operating unit 300, for example, is described below by way of example. In this case, CPU 304 calculates the correction data of RAM 102 in secondary gamma correction circuit 32 based on the T-V characteristic in PROM 302, and rewrites the correction data in RAM 102 based on the calculated result. With a change in the correction data in range A, CPU 304 also changes the correction data in range B. This change is effected by changing the setting of slope data a and offset data b. In addition, the location of the boundary between ranges A and B can be changed based on a command from operating unit 300, in which case it is sufficient for CPU 304 to change boundary data c.

Changing Primary Gamma Correction Data

The contrast ratio and brightness adjustment of the overall screen can be adjusted in the present embodiment by changing the primary gamma correction data related to the entire screen.

This contrast ratio adjustment can be effected, for example, by operating a rotary knob, for example, on operating unit 300 for contrast ratio adjustment. For example, the primary gamma correction characteristic indicated by the solid line in FIG. 3 can be changed to the primary gamma correction having a greater slope as indicated by the dotted line in FIG. 3. The contrast ratio can thus be increased by rewriting the correction data of the RAM table in primary gamma correction circuit 24 to contain the contrast ratio adjustment data.

Brightness adjustment, on the other hand, can be accomplished by operating, for example, a rotary knob for brightness adjustment on operating unit 300. It is possible, for example, to shift the overall [brightness level] to obtain the primary gamma characteristic shown by the dotted line in FIG. 4 while maintaining the slope of the primary gamma characteristic shown by the solid line in FIG. 4. The brightness of the overall screen can thus be reduced by rewriting the correction data of the RAM table in primary gamma correction circuit 24 to contain the brightness adjustment data.

It is therefore possible to easily accommodate changing the contrast ratio and brightness of the overall screen by rewriting the content of the primary gamma correction RAM table in which primary gamma correction data for the entire range is stored rather than rewriting the secondary gamma correction RAM table 102 in which correction data for part of the range is stored.

First Alternative Embodiment of a Secondary Gamma Correction Circuit

An alternative embodiment of a secondary gamma correction circuit is shown in FIG. 8. The functional difference between the circuit in FIG. 5 and the secondary gamma correction circuit in FIG. 8 is that, as shown in FIG. 9 (A), the linear approximation operation is accomplished using a plurality of, for example three, different lines in range B.

When the actual T-V characteristic of the liquid crystal display panel is as shown in FIG. 17, the ideal secondary gamma correction characteristic is as shown in FIG. 18. Therefore, the secondary gamma correction characteristic in FIG. 9 (A) is closer to the ideal characteristic than the secondary gamma correction characteristic in FIG. 6.

As a result, the secondary gamma correction circuit in FIG. 8 comprises a comparator 120 for comparing the input image data X with boundary data c, f, and i for a plurality of linear approximation areas, and determining with which linear approximation interval input image data X is associated. Note that comparator 120 is newly added to the circuit configuration shown in FIG. 8 to clarify the comparison with the circuit configuration shown in FIG. 5. However, this comparator 120 is functionally the same as range evaluation unit 110 in that it determines the range of input image data X. Therefore, area evaluation unit 110 can also be used for the function of comparator 120 by entering boundary data c, f, and i to range evaluation unit 110. In this case comparator 120 is unnecessary, and comparator 120 can be understood as a circuit achieving part of the functionality of a broadly defined range evaluation unit 110.

The secondary gamma correction circuit shown in FIG. 8 further comprises a register 122 for storing slope data a, d, and g, and offset data b, e, and h for each line. Slope data and offset data for the linear approximation range determined by comparator 120 are output from this register 122. For example, if it is determined by comparator 120 that $c_{13}$ $X_{13}$ f, line slope data a and offset data b of the line Y=a*X+b are output from register 122.

Based on the slope data from register 122, first selector 106 in FIG. 8 selects and outputs the output from one or a plurality of first to third bit shifters 104A to 104C. The adder 108 in FIG. 8 adds or subtracts the offset data from register 122 to perform the operation corresponding to the linear approximation range with which the input image data X is associated.

Second Alternative Embodiment of a Secondary Gamma Correction Circuit

This embodiment corrects according to the secondary gamma correction characteristic shown in FIG. 9 (B) using the circuit shown in FIG. 8. The advantage of the secondary gamma correction characteristic shown in FIG. 9 (B) is that by using a curve for correction in image areas near the white level, the secondary gamma correction characteristic shown in FIG. 9 (B) more closely approximates the ideal gamma correction characteristic shown in FIG. 18 than does the above-described secondary gamma correction characteristic shown in FIG. 9 (A). In addition, by using the secondary gamma correction characteristic shown in FIG. 9 (B), correction following the correction curve can be applied even when the first driving range shown in FIG. 17 is expanded to the second driving range toward the large curvature, low voltage driving range end of the curve on the white level side in FIG. 17. That is, the driving range can be expanded to a range that cannot be achieved with linear approximation. By thus extending the driving range to the white level side, the upper transmittance limit is extended, and the contrast ratio can be further increased. As a result, the same brightness as before can be assured even if the backlight power is dropped, and power consumption can be reduced by a corresponding amount. The voltage increment per gradation level is also increased, and the S/N ratio is increased, as a result of the expanded driving voltage range.

Correction according to the secondary gamma correction characteristic shown in FIG. 9 (B) is accomplished in areas A and B of FIG. 9 (B) in the same manner as the above-described embodiment according to the secondary gamma correction characteristic shown in FIG. 9 (A).

Correction data is stored in RAM 102 for the white level range C in FIG. 9 (B) in the present embodiment. Therefore, when it is determined by range evaluation unit 110 of the secondary gamma correction circuit in FIG. 8 for input image data X that X>j, the correction data for range C in FIG. 9 (B) is read based on the address specification output by address generator 100. In addition, the output of RAM 102 is selected by second selector 112.

It should be noted that the present embodiment can also be applied with a secondary gamma correction characteristic obtained by linear approximation using a single line for range B between areas A and C in FIG. 9 (B).

Third Alternative Embodiment of a Secondary Gamma Correction Circuit

A further alternative embodiment of a secondary gamma correction circuit is shown in FIG. 10. The secondary gamma correction circuit in FIG. 10 shows a circuit improved to reduce the capacity of RAM 102 in FIG. 5. Referring to FIG. 11, which has a curve in two ranges similarly to the secondary gamma correction characteristic in FIG. 9 (B), the circuit in FIG. 10 assumes a first base line Y' in range A and a second base line Y" in area C, and stores only the difference data between the final correction data and first and second base lines Y' and Y" to RAM 102 in FIG. 10. To describe this using FIG. 12, which is a partially enlarged view showing range A in FIG. 11, data on first base line Y' in area A is obtained by a linear approximation operation, and only the difference data Δ1, Δ2, ... added to or subtracted therefrom is stored in RAM 102. Data on the second base line Y" in range C is also obtained by a linear approximation operation, and only the difference data added to or subtracted therefrom is stored in RAM 102.

As a result, a third selector 130 for selecting data matching first and second base lines Y' and Y" from among fixed data and three bit shifters 104A to 104C, for example, and an adder 132 for adding or subtracting the output of this third selector 130 and the difference data from RAM 102, are further provided in the secondary gamma correction circuit shown in FIG. 10. That is, the output from the three bit shifters 104A to 104C is used for the linear approximation operation in range B of FIG. 11, and is also used for a linear approximation operation using first and second base lines Y' and Y" in ranges A and C. The fixed data input to third selector 130 is used independently when the first or second base line Y' or Y" is parallel with the X axis, that is, has a slope of zero, or is used as offset data for first or second base line Y' or Y" added to the result of the operation of the three bit shifters 104A to 104C.

With the circuit shown in FIG. 10, when the input image data X is determined by range evaluation unit 110 to be associated with range A or C in FIG. 11, third selector 130 to which the evaluation signal is input selects data matching first base line Y' or second base line Y" of FIG. 11 from among one or a plurality of the fixed data and the three bit shifters 104A to 104C. In addition, the difference data of FIG. 12 is output from RAM 102 based on the address generated by address generator 100 for the input image data X. These values are then added or subtracted by adder 132, and the output of this adder 132 is selected by second selector 112.

As a result, the required capacity of RAM 102 in FIG. 10 is less than that of FIG. 5 because the bit count of the difference data is less than the bit count of the correction data [stored] in FIG. 5.

It should be noted that the base line Y' set in ranges A and C shall not be limited to one line, and a plurality of lines can be defined. In this case, ranges evaluation unit 110 determines to which of the ranges in which a different line is used the input image data X is associated, and based on the result of this determination the third selector 130 can select the data matching the corresponding base line as described above.

The present embodiment can, moreover, also be used in an embodiment obtaining gamma correction data shown in FIGS. 9 (A) and (B).

Fourth Alternative Embodiment of a Secondary Gamma Correction Circuit

This embodiment applies secondary gamma correction across the entire gradation range, for example, of input digital image data using RAM and linear approximation, and, moreover, reduces the required RAM capacity. A secondary gamma correction circuit according to the present embodiment is shown in FIG. 13, and the secondary gamma correction characteristic thereof is shown in FIG. 14.

In FIG. 13, this secondary gamma correction circuit comprises RAM 140, register address generator 142, register 144, and adder 146.

Only base correction data D (0), D (4), D (8), ... D (n), D (n+4), and so on shown in FIG. 14 are stored to RAM 140. This base correction data is correction data for every $2^k$ (where k is a natural number) gradation levels, for example for every four gradation levels, of the input image data. Referring to a single line, the base correction data is used in each linear approximation interval of a four-gradation range in the input image data. Value n in FIG. 14 is any number that is a multiple of four, and base data for each gradation that is a multiple of four is expressed, as shown in FIG. 14, as D (0), D (4), D (8), ... D (n), D (n+4), and so on.

Because base correction data is read from RAM 140 for every fourth gradation level of the input image data, only the high six bits of the input eight-bit image data are used as to address RAM 140.

Difference data Δ1, Δ2, Δ3, ... Δ15, and so on shown in FIG. 14 are stored to register 144. In each linear approximation interval of a $2^k$ gradation range for a particular line, there are only $2^k-1$ difference data; for example, in each linear approximation interval of line f1(X) in FIG. 14, there are three difference data, Δ1, Δ2, and Δ3. Likewise, in each linear approximation interval of line f2(X) in FIG. 14, there are the three difference data Δ7, Δ8, and Δ9, and in each linear approximation interval of line f3(X) in FIG. 14, there are the three difference data Δ13, Δ14, and Δ15.

The present embodiment is also shown using by way of example a case in which the boundary points between lines do not evenly match a position of every fourth gradation level. As a result, independent difference data is required for the linear approximation intervals of any range of four gradation levels containing such boundary points. The difference data Δ4, Δ5, and Δ6, and difference data Δ10, Δ11, and Δ12, in FIG. 14 are difference data for ranges of four gradation levels containing such boundary points. It should be noted that when the boundary points between lines match a position of every fourth gradation level in the input image data, these [independent] difference data are not needed.

A register address generator 142 is provided for reading difference data in register 144. This register address generator 142 generates an address for reading corresponding difference data based on the 8-bit input image data. It should be noted that because difference data for image data with a gradation value that is a multiple of four does not exist, an address is not generated from register address generator 142 in this case. The read difference data and the base correction data from RAM 140 are then added or subtracted by adder 146 (FIG. 14 shows an example when values are added) to obtain the image data after secondary gamma correction.

Operation of this secondary gamma correction circuit is described next. Referring to FIG. 14, for example, when image data having a gradation value n that is a multiple of four is input to the secondary gamma correction circuit, base correction data D(n) is read from RAM 140, and an address is not generated by register address generator 142. As a result, base correction data D(n) is output from adder 146. When image data with a gradation value (n+1) is input to the secondary gamma correction circuit, base correction data D(n) is read from RAM 140 as above, and difference data Δ10 is read from register 144 based on an address generated by register address generator 142. As a result, D(n)+Δ10 is output from adder 146.

In this way, bit shifting as used in the above-described embodiments is not necessary, and the storage capacity of RAM 140 and register 144 can be reduced, while continuing to use linear approximation for secondary gamma correction in the present embodiment. Moreover, bit shifting for fixing the slope of each line is not used in the present embodiment, and the slope of each line can be determined according to the stored content of RAM 140 and register 144, thereby enabling greater freedom in line slope settings.

It should be noted that the interval between the base correction data and the corresponding gradation value of the input image data is preferably every $2^k$ gradations because a certain number of bits of the input image data can then be used directly to address RAM 140. This interval is ideally every four gradations or every eight gradations. This is because if the interval is every two gradations, the base correction data increases, and the capacity of RAM 140 increases. In addition, if the interval is every 16 gradations, the difference data increases, and the capacity of register 144 increases.

The present embodiment can, moreover, also be used in an embodiment obtaining gamma correction data for range B in FIGS. 9 (A) and (B).

Fifth Alternative Embodiment of a Secondary Gamma Correction Circuit

The present embodiment is a variation of the secondary gamma correction circuit shown in FIG. 13, and is shown in FIG. 15. Referring to FIG. 15, RAM 140 and adder 146 have the same function as those in FIG. 13. In place of register address generator 142 and register 144 in FIG. 13, however, the circuit in FIG. 15 has the following configuration.

First, a slope data register 150 is provided for storing particular difference data, that is, the smallest difference data Δ1, Δ7, Δ13 in each linear approximation interval not containing a boundary point, for each line f1(X), f2(X), f3(X) and so on shown in FIG. 14 as slope data 1, 2, 3, and so on of each line.

The difference data other than difference data Δ1 of line f1(X), that is, difference data Δ2 and Δ3, can be represented as $$\Delta 2 = 2 \times \Delta 1 \quad (1)$$

$$\Delta 3 = \Delta 1 + \Delta 2 \quad (2)$$

where the relationship between the difference data of the other lines can be similarly expressed.

As a result, difference data calculators 152, 154, and 156 for calculating difference data other than the smallest difference data Δ1, Δ7, Δ13 are provided as shown in FIG. 1. Each of the difference data calculators is identically constructed, comprising bit shifter 160 for doubling slope data (Δ1, Δ7, or Δ13), and adder 162 for adding the output of this bit shifter 160 and the slope data. Bit shifter 162 calculates equation (1) above, and adder 162 calculates equation (2) above.

Difference data Δ4 to Δ6 and Δ10 to Δ12 for the ranges around the boundaries between lines are stored to boundary approximation data register 170. A selector 172 is also provided for selecting one of the plural difference data inputs from the three difference data calculators 152, 154, and 156, and the boundary approximation data register 170.

An range evaluation unit 174 is further provided for outputting a selection signal whereby selector 172 selects one difference data input based on the input image data and boundary data.

As in the embodiment shown in FIG. 13, there is greater freedom in setting the slope of lines used for linear approximation in the present embodiment because the slope of each line can be set based on the content stored to register 150.

The present embodiment can, moreover, also be used in an embodiment obtaining gamma correction data for range B in FIGS. 9 (A) and (B).

Description of an Electronic Device

An electronic device comprising a liquid crystal display apparatus according an above-described embodiment comprises a display information output source 1000, display information processing circuit 1002, display drive circuit 1004, liquid crystal panel or other display panel 1006, clock signal generator 1008, and power supply circuit 1010 as shown in FIG. 20. The display information output source 1000 comprises ROM, RAM, or other memory, and a tuning circuit for tuning and outputting a television signal, and outputs a video signal or other display information based on a clock signal from clock signal generator 1008. The display information processing circuit 1002 processes and outputs display information based on a clock signal from the clock signal generator 1008. This display information processing circuit 1002 is configured on the above-described signal processing board 10. In addition to the above-noted dedicated liquid crystal display boards 30R, 30G, 30B, the display drive circuit 1004 comprises a scanning drive circuit and a data drive circuit for driving information display on display panel 1006. The power supply circuit 1010 supplies power to each of the above circuits.

TEXT IN FIGURES

FIG. 1
AD-converter 16
digital decoder 18
frame memory 20
RAM (primary gamma correction) 24
amplifier 40
polarity inversion circuit 36
phase expansion circuit 34
secondary gamma correction circuit 32
buffer 42
LCD panel 50R
LCD panel 50G
dedicated LCD board 30G
LCD panel 50B
dedicated LCD board 30B
FIG. 2
Output data (Y)
Input data (X)
gamma correction characteristic for a CRT
primary gamma correction characteristic
linear characteristic
FIG. 3
Output data (Y)
Input data (X)
FIG. 4
Output data (Y)
Input data (X)
FIG. 5
boundary data
area evaluation unit 110→area selection signal
image data→address generator 100→address
slope data→first selector 106
offset data→adder 108
second selector 112
shift register 200
latch circuit 202
selector 212A, 212B, 212C, 212D
corrected image data 1, 2, 3, 4
image synchronization signal→timing signal generator 220→display control signal
FIG. 6
Output data (Y)
Input data (X)
FIG. 7
primary gamma correction circuit 24
secondary gamma correction circuit 32
operating unit 300
FIG. 8
boundary data
area evaluation unit 110→area selection signal
image data→address generator 100→address
slope data→first selector 106
offset data→adder 108
second selector 112→corrected image data
linear approximation boundary data c, f, i→comparator 120 register 122
FIG. 9 (A), (B)
data (Y)
Input data (X)
FIG. 10
boundary data
area evaluation unit 110→area selection signal
→base line selection signal
image data→address generator 100→address
difference data→adder 132
second selector 112→corrected image data
base line selection data→third selector 130
fixed data
first selector
register 122
adder 108
FIG. 11, FIG. 12, FIG. 14, FIG. 18, FIG. 19
Output data (Y)
Input data (X)
FIG. 13
image data
boundary data→register address generator 142
difference data register 144
difference data Δ1, Δ2, Δ3, . . . . Δ15
adder 146→corrected image data
FIG. 15
image data
slope data register 150
data 1, 2, 3
adder 162
difference data operator 154
difference data operator 156
boundary data→area evaluation unit 174→area selection signal
boundary approximation data register 170
selector 172
adder 146→corrected image data
FIG. 16
dot clock
image data
FIG. 17
Transmittance T
Applied voltage V
first driving range
second driving range
FIG. 20
power supply circuit 1010
clock signal generator 1008
display information output source 1000
display information processing circuit 1002
liquid crystal panel 1006

Exemplary of an electronic device thus configured are a liquid crystal projector as shown in FIG. 21, and a multimedia-capable personal computer (PC) as shown in FIG. 22.

The liquid crystal projector shown in FIG. 21 is a projection-type projector in which transmissive type liquid crystal panels are used as light valves and a three piece prism optical system, for example, are used.

In a projector 1100 as shown in FIG. 21, projection light emitted from white light source lamp unit 1102 is separated into the three primary colors red, green, and blue by means of a plurality of mirrors 1106 and two dichroic mirrors 1108 inside light guide 1104, and is guided to three liquid crystal panels 1110R, 1110G, and 1110B for displaying images of the respective colors. Light modulated by liquid crystal panels 1110R, 1110G, and 1110B is then incident to dichroic prism 1112 from three directions. Red R and blue B light are bent 90° by dichroic prism 1112, and green G light passes straight through. As a result, the respective color images are synthesized, and a color image is projected to a screen, for example, through projection lens 1114.

The personal computer 1200 shown in FIG. 22 comprises a main unit 1204 equipped with a keyboard 1202, and a liquid crystal display screen 1206.

It should be noted that the present invention shall not be limited to the embodiments described above, and various other embodiments are possible within the scope of the present invention.

What is claimed:

1. A digital gamma correction circuit for correcting digital image data that has been gamma corrected for a particular characteristic to digital image data suitable for driving a display on a liquid crystal display, said digital gamma correction circuit comprising:

a first digital gamma correction circuit for applying a first digital gamma correction including reverse gamma correction for effectively restoring digital image data gamma corrected for said particular characteristic to the digital image data before gamma correction for said particular characteristic; and a second digital gamma correction circuit for applying a second digital gamma correction based on an applied voltage-transmittance characteristic of the liquid crystal display to digital image data either before or after gamma correction for said particular characteristic, the second digital gamma correction circuit including a linear approximation operator for gamma correcting input digital image data by linear approximation using a plurality of lines, wherein the linear approximation operator includes:

a first memory table for storing, for each linear approximation interval, base correction data common to a linear approximation interval of a $2^k$ (where k is a natural number) gradation range of the input digital image data;

a second memory table for storing at least ($2^k-1$) difference data for addition or subtraction with the base correction data for the $2^k$ gradation range.

2. The digital gamma correction circuit according to claim 1, wherein the first digital gamma correction circuit is disposed upstream of the second digital gamma correction circuit, and wherein said digital gamma correction circuit further comprises a bypass line for carrying digital image data to which gamma correction for said particular characteristic has not been applied to the second digital gamma correction circuit without passing through the first digital gamma correction circuit.

3. The digital gamma correction circuit according to claim 1, wherein the first digital gamma correction circuit comprises a first memory table for storing correction data for the entire gradation range.

4. The digital gamma correction circuit according to claim 3, wherein the correction data stored to the first memory table contains the contrast ratio adjustment data which changes when the contrast ratio of an image driven for display on a liquid crystal display is adjusted.

5. The digital gamma correction circuit according to claim 3, wherein the correction data stored to the first memory table contains the brightness adjustment data which changes when the brightness of an image driven for display on a liquid crystal display is adjusted.

6. A digital gamma correction circuit for correcting digital image data that has been gamma corrected for a particular characteristic to digital image data suitable for driving a display on a liquid crystal display, said digital gamma correction circuit comprising:

a first digital gamma correction circuit for applying a first digital gamma correction including reverse gamma correction for effectively restoring digital image data gamma corrected for said particular characteristic to the digital image data before gamma correction for said particular characteristic;

a second digital gamma correction circuit for applying a second digital gamma correction based on an applied voltage-transmittance characteristic of the liquid crystal display to digital image data either before or after gamma correction for said particular characteristic;

a comparator to at least determine whether a gradation value of digital image data input to the second digital gamma correction circuit is associated with a first range on a low gradation side, or a second range outside said first range;

a memory table for storing correction data for input digital image data associated with said first range, and from which correction data for said input digital image data is read; and a linear approximation operator for correcting input digital image data associated with said second range by means of a linear approximation operation according to at least one line with a specific slope and offset, the linear approximation operator comprising a plurality of bit shifters for bit shifting input digital image data to multiply the input digital image data $2^n$ or $½^n$ times (where n is a natural number).

7. The digital gamma correction circuit according to claim 6, wherein the linear approximation operator further comprises:

a selector for selecting the output from at least one of the plurality of bit shifters according to the slope data of at least one line; and a first operator for adding to or subtracting from the selector output the offset data of at least one line.

8. The digital gamma correction circuit according to claim 7, wherein the linear approximation operator uses a plurality of lines in said second range for linear approximation in each of a plurality of linear approximation intervals, said linear approximation operator further comprising:

a register for storing a plurality of slope data and a plurality of offset data; and wherein said comparator compares boundary data for each of said linear approximation intervals with input digital image data, and controls reading the corresponding slope data and offset data for a linear approximation interval from said register.

9. The digital gamma correction circuit according to claim 7, wherein gamma correction data for the first range is separated into base line data located on at least one base line, and difference data added to or subtracted from at least one base line data;

wherein said second memory table stores said difference data;

wherein said linear approximation operator is configured to output at least one base line data; and wherein said digital gamma correction circuit further comprises a second operator for adding or subtracting the difference data output from the second memory table, and the base line data output from the linear approximation operator.

10. The digital gamma correction circuit according to claim 1, wherein said linear approximation operator further comprises:

an operator for adding or subtracting base correction data and difference data output from said second and third memory tables according to a gradation value of the input digital image data.

11. The digital gamma correction circuit according to claim 1, wherein said linear approximation operator further comprises:

a difference data operator for calculating the remaining difference data of a linear approximation interval for each line based on at least one difference data for each line from the third memory table; and an operator for adding or subtracting at least one difference data from the second memory table, or other difference data from the difference data operator, with base correction data from a first memory table based on a gradation value of the input digital image data.

12. The digital gamma correction circuit according to claim 1, wherein said first and second digital gamma correction circuits are mounted on different circuit boards.

13. A liquid crystal display apparatus comprising a data processing/liquid crystal display driving circuit containing a digital gamma correction circuit according to claim 1 for driving the display of an image on said liquid crystal display based on image data to which data processing including first and second digital gamma correction has been applied.

14. An electronic device comprising a data processing/liquid crystal display driving circuit containing a digital gamma correction circuit according to claim 1 for driving the display of an image on said liquid crystal display based on image data to which data processing including first and second digital gamma correction has been applied; and a power supply circuit for supplying power to said data processing/liquid crystal display driving circuit.

15. A digital gamma correction circuit for correcting input digital image data to digital image data suited to driving the display of a liquid crystal display, said digital gamma correction circuit comprising:

a range evaluation unit for determining whether a gradation value of the input digital image data belongs to a first range on a low gradation side, a second range on a high gradation side, or a third range between said first and second ranges;

a memory table for storing correction data for input digital image data associated with the first and second ranges, and reading correction data for the input digital image data; and a linear approximation operator for correcting input digital image data associated with the third range by means of a linear approximation operation based on a single line having a specific slope and offset the linear approximation operator comprising a plurality of bit shifters for bit shifting input digital image data and multiplying the input digital image data by $2^n$ or $½^n$ (where n is a natural number).

16. The digital gamma correction circuit according to claim 15, wherein the linear approximation operator further comprises:

a selector for selecting and outputting output from at least one of said plurality of bit shifters according to slope data of at least one line; and a first operator for adding or subtracting the offset data of at least one line with the selector output.

17. The digital gamma correction circuit according to claim 16, wherein the linear approximation operator obtains a linear approximation in each of a plurality of linear approximation intervals using a plurality of lines in the third range; and the linear approximation operator further comprises a register for storing a plurality of slope data and a plurality of offset data; and the range evaluation unit compares boundary data for each linear approximation interval with the input digital image data to control reading the corresponding slope data and offset data for the linear approximation interval from the register.

18. The digital gamma correction circuit according to claim 16, wherein gamma correction data for the first and second ranges is separated into base line data positioned on at least one base line in the first and second areas, and difference data in the first and second ranges that is added to or subtracted from at least one of the base line data;

wherein the memory table stores difference data for the first and second ranges;

wherein the linear approximation operator outputs base line data in the first and second ranges; and wherein said digital gamma correction circuit further comprises a second operator for adding or subtracting difference data output from the memory table and base line data output from the linear approximation operator.

19. A liquid crystal display apparatus comprising a liquid crystal display, and a liquid crystal display driving circuit containing a digital gamma correction circuit according to claim 15 for driving the display of an image on said liquid crystal display unit based on image data to which digital gamma correction has been applied.

20. An electronic device comprising a liquid crystal display apparatus according to claim 19, and a power supply circuit for supplying power to said liquid crystal display apparatus.

21. A gamma correction method for correcting digital image data that has been gamma corrected for a particular characteristic to digital image data suitable for driving a display on a liquid crystal display, said gamma correction method comprising steps of:

applying a first digital gamma correction including a reverse gamma correction for effectively restoring digital image data that has been gamma corrected for said particular characteristic to the digital image data before gamma correction for said particular characteristic; and applying a second digital gamma correction based on an applied voltage-transmittance characteristic of the liquid crystal display to said digital image data either before or after said gamma correction for a particular characteristic has been applied, the second digital gamma correction including linear approximation operation using a plurality of lines, wherein the step of applying a second digital gamma correction includes steps of:

storing, for each linear approximation interval, base correction data common to a linear approximation interval of a $2^k$ (where k is a natural number) gradation range of the input digital image data;

storing at least ($2^k-1$) difference data for addition or subtraction with the base correction data for the $2^k$ gradation range.

22. The gamma correction method according to claim 21, wherein said first digital gamma correction circuit comprises a first memory table for storing correction data for an entire gradation range including contrast ratio adjustment data which changes when the contrast ratio of an image driven for display to a liquid crystal display is adjusted.

23. The gamma correction method according to claim 21, wherein said first digital gamma correction circuit comprises a first memory table for storing correction data for an entire gradation range including brightness adjustment data which changes when the brightness of an image driven for display to a liquid crystal display unit is adjusted.

* * * * *